US011923558B2

(12) United States Patent
Wakimoto

(10) Patent No.: US 11,923,558 B2
(45) Date of Patent: Mar. 5, 2024

(54) RECTANGULAR SECONDARY BATTERY

(71) Applicant: SANYO Electric Co., Ltd., Daito (JP)

(72) Inventor: Ryoichi Wakimoto, Hyogo (JP)

(73) Assignee: SANYO Electric Co., Ltd., Osaka (JP)

(*) Notice: Subject to any disclaimer, the term of this patent is extended or adjusted under 35 U.S.C. 154(b) by 1182 days.

(21) Appl. No.: 16/488,366

(22) PCT Filed: Feb. 22, 2018

(86) PCT No.: PCT/JP2018/006334
§ 371 (c)(1),
(2) Date: Aug. 23, 2019

(87) PCT Pub. No.: WO2018/155522
PCT Pub. Date: Aug. 30, 2018

(65) Prior Publication Data
US 2020/0251694 A1 Aug. 6, 2020

(30) Foreign Application Priority Data
Feb. 27, 2017 (JP) .................. 2017-034343

(51) Int. Cl.
*H01M 50/342* (2021.01)
*H01M 50/176* (2021.01)
(Continued)

(52) U.S. Cl.
CPC ....... *H01M 50/342* (2021.01); *H01M 50/176* (2021.01); *H01M 50/184* (2021.01);
(Continued)

(58) Field of Classification Search
CPC .................................. H01M 50/176
See application file for complete search history.

(56) References Cited

U.S. PATENT DOCUMENTS

2009/0004561 A1  1/2009  Nansaka et al.
2009/0239133 A1  9/2009  Kosugi
(Continued)

FOREIGN PATENT DOCUMENTS

CN    205388985 U  *  7/2016
CN    205388985 U     7/2016
(Continued)

OTHER PUBLICATIONS

English Translation of Office Action dated Aug. 4, 2021, issued in counterpart to CN Application No. 201880013131.X. (4 pages).
(Continued)

*Primary Examiner* — Maria Laios
(74) *Attorney, Agent, or Firm* — WHDA, LLP

(57) ABSTRACT

A rectangular secondary battery includes a rectangular casing that contains an electrode body, a sealing plate that seals an opening of the rectangular casing; a positive electrode tab group that is composed of a plurality of positive electrode tabs, a positive electrode terminal that is electrically connected to the positive electrode tab group and attached to the sealing plate, a second positive electrode current collector that is electrically connected to the positive electrode tab group and the positive electrode terminal, and a second insulator that is disposed between the sealing plate and the second positive electrode current collector. The sealing plate has a gas discharge valve. The sealing plate has a first recess. The second insulator has a first protrusion. In a transversal direction of the sealing plate, the first recess is displaced from a center of the sealing plate toward an end portion of the sealing plate.

10 Claims, 13 Drawing Sheets

(51) Int. Cl.
*H01M 50/184* (2021.01)
*H01M 50/186* (2021.01)
*H01M 50/191* (2021.01)
*H01M 50/536* (2021.01)
*H01M 50/54* (2021.01)
*H01M 50/55* (2021.01)
*H01M 50/553* (2021.01)
*H01M 50/562* (2021.01)
*H01M 50/566* (2021.01)
*H01M 50/578* (2021.01)

(52) U.S. Cl.
CPC ....... *H01M 50/186* (2021.01); *H01M 50/553* (2021.01); *H01M 50/191* (2021.01); *H01M 50/536* (2021.01); *H01M 50/54* (2021.01); *H01M 50/55* (2021.01); *H01M 50/562* (2021.01); *H01M 50/566* (2021.01); *H01M 50/578* (2021.01)

(56) References Cited

U.S. PATENT DOCUMENTS

2015/0295221 A1* 10/2015 Urano ............... H01M 10/0431
                                                        429/61
2017/0025667 A1   1/2017 Yamawaki et al.
2018/0254466 A1*  9/2018 Aikata ................ H01M 50/538

FOREIGN PATENT DOCUMENTS

| CN | 106374078 A   | 2/2017  |
| JP | 2008-226625 A | 9/2008  |
| JP | 2009-32640 A  | 2/2009  |
| JP | 2013-157099 A | 8/2013  |
| JP | 2013-161554 A | 8/2013  |
| JP | 2016-207510 A | 12/2016 |
| WO | 2014/080518 A1| 5/2014  |

OTHER PUBLICATIONS

International Search Report dated May 29, 2018, issued in counterpart International Application No. PCT/JP2018/006334 (2 pages).

* cited by examiner

RECTANGULAR SECONDARY BATTERY

TECHNICAL FIELD

The present invention relates to a rectangular secondary battery.

BACKGROUND ART

Rectangular secondary batteries, such as non-aqueous electrolyte secondary batteries and the like, are used as electric power sources for driving electric automobiles (EV), hybrid electric automobiles (HEV, PHEV), and the like.

The rectangular secondary batteries each have a battery case that is composed of a bottomed rectangular casing that has an opening and a sealing plate that seals the opening. The battery case contains, as well as an electrolyte, an electrode body that is composed of a positive electrode plate, a negative electrode plate, and a separator. A positive electrode terminal and a negative electrode terminal are attached to the sealing plate. The positive electrode terminal is electrically connected to the positive electrode plate via a positive electrode current collector, and the negative electrode terminal is electrically connected to the negative electrode plate via a negative electrode current collector.

The positive electrode plate includes a positive electrode core, which is made of a metal, and a positive electrode active material mixture layer, which is formed on a surface of the positive electrode core. A positive-electrode-core exposed portion, on which the positive electrode active material mixture layer is not formed, is formed on a part of the positive electrode core. The positive electrode current collector is connected to the positive-electrode-core exposed portion. The negative electrode plate includes a negative electrode core, which is made of a metal, and a negative electrode active material mixture layer, which is formed on a surface of the negative electrode core. A negative-electrode-core exposed portion, on which the negative electrode active material mixture layer is not formed, is formed on a part of the negative electrode core. The negative electrode current collector is connected to the negative-electrode-core exposed portion.

For example, PTL 1 proposes a rectangular secondary battery that includes a rolled electrode body that has a rolled positive-electrode-core exposed portion at one end portion thereof and a rolled negative-electrode-core exposed portion at the other end portion thereof. PTL 2 proposes a rectangular secondary battery that includes an electrode body that has a positive-electrode-core exposed portion and a negative-electrode-core exposed portion at one end portion thereof.

CITATION LIST

Patent Literature

PTL 1: Japanese Published Unexamined Patent Application No. 2009-032640

PTL 2: Japanese Published Unexamined Patent Application No. 2008-226625

SUMMARY OF INVENTION

Technical Problem

An insulator is disposed in a rectangular secondary battery between a sealing plate and a current collector in order to prevent the sealing plate and the current collector from directly contacting each other. Preferably, the insulator is prevented from moving in such a way that the insulator is displaced with respect to the sealing plate. For example, if the insulator moves so as to be displaced with respect to the sealing plate, sealability between the sealing plate and the terminal may decrease, or the current collection portion may be damaged.

A main object of the present invention is to provide a rectangular secondary battery that has higher reliability.

Solution to Problem

A rectangular secondary battery according to an aspect of the present invention includes an electrode body that includes a positive electrode plate and a negative electrode plate, a rectangular casing that has an opening and contains the electrode body, a sealing plate that seals the opening, a tab that is provided on the positive electrode plate or the negative electrode plate, a tab group that is composed of a plurality of the tabs, a terminal that is electrically connected to the tab group and attached to the sealing plate, a current collector member that is electrically connected to the tab group and the terminal, and an insulator that is disposed between the sealing plate and the current collector member. The sealing plate has a gas discharge valve. The sealing plate has a first recess at a position facing the insulator. The insulator has a first protrusion at a position facing the sealing plate. The first protrusion is disposed in the first recess. In a transversal direction of the sealing plate, the first recess is displaced from a center of the sealing plate toward an end portion of the sealing plate.

With the structure described above, because the first protrusion of the insulator is disposed in the first recess of the sealing plate, it is possible to suppress large displacement of the insulator with respect to the sealing plate. In the transversal direction of the sealing plate, the first recess is displaced from the center of the sealing plate toward an end portion of the sealing plate. Therefore, it is possible to suppress decrease of the strength of the sealing plate. Accordingly, even when pressure inside the casing increases, the sealing plate does not deform easily.

If the strength of the sealing plate decreases and the sealing plate considerably deforms, depending on the deformation, the operation pressure of the gas discharge valve of the sealing plate may vary. Moreover, due to the deformation of the sealing plate, the gas discharge valve may become damaged at an unintended timing.

The current collector member may be a positive electrode current collector member that is electrically connected to the positive electrode plate, or may be a negative electrode current collector member that is electrically connected to the negative electrode plate. Both of an insulator disposed between the sealing plate and the positive electrode current collector member and an insulator disposed between a sealing plate 2 and the negative electrode current collector member may have first protrusions, the sealing plate may have two recesses, and the protrusions may be respectively disposed in the recesses.

Advantageous Effects of Invention

With the present invention, it is possible to provide a rectangular secondary battery having high reliability.

DESCRIPTION OF EMBODIMENTS

The structure of a rectangular secondary battery 20 according to an embodiment will be described below. The present invention is not limited to the embodiment described below.

Figure 1:
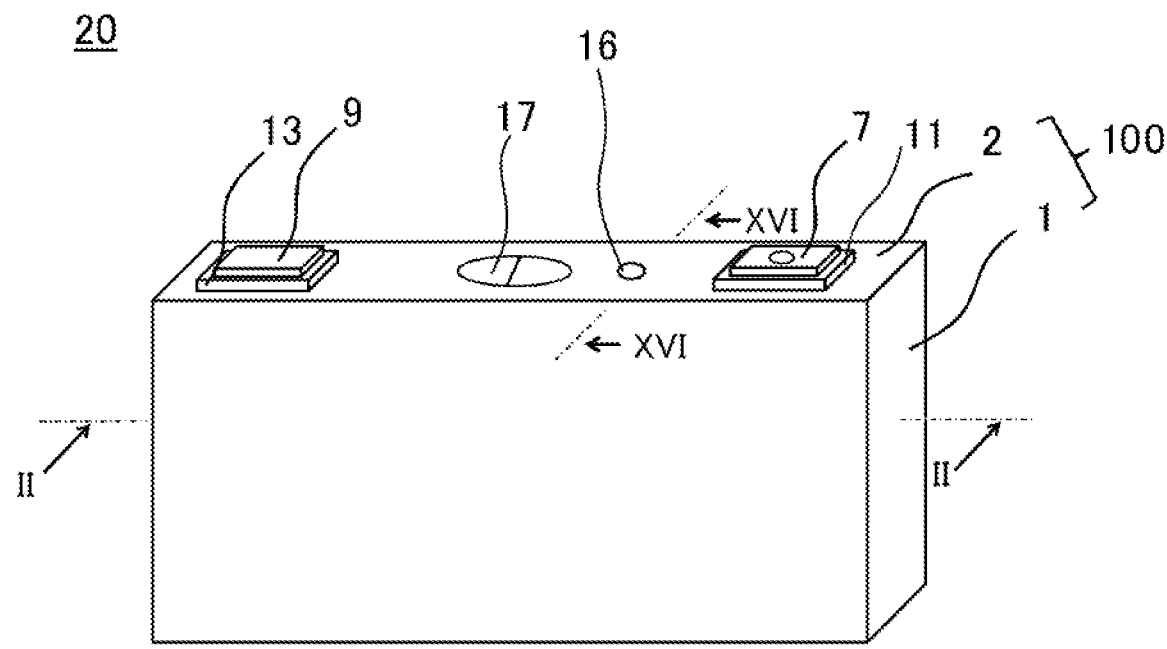
FIG. 1 is a perspective view of a rectangular secondary battery according to an embodiment.
Figure 2:
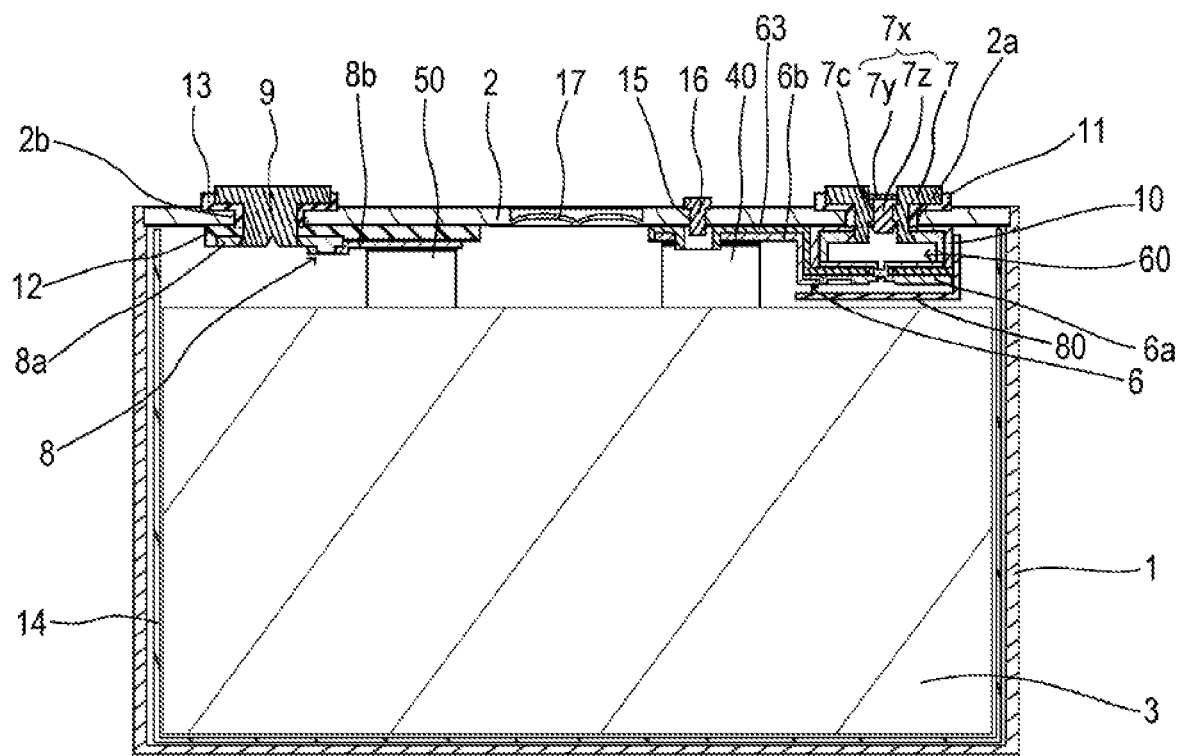
FIG. 2 is a sectional view of a rectangular secondary battery taken along line II-II in FIG. 1.

FIG. 1 is a perspective view of the rectangular secondary battery 20. FIG. 2 is a sectional view taken along line II-II in FIG. 1. As illustrated in FIGS. 1 and 2, the rectangular secondary battery 20 includes a battery case 100 that is composed of a rectangular casing 1, which has a bottomed angular-tube-like shape having an opening, and a sealing plate 2, which seals the opening of the rectangular casing 1. Preferably, the rectangular casing 1 and the sealing plate 2 are each made of a metal such as aluminum or an aluminum alloy. The rectangular casing 1 contains, as well as an electrolyte, a stacked electrode body 3, in which a positive electrode plate and a negative electrode plate are stacked with a separator interposed therebetween. An insulation sheet 14, which is made of a resin, is disposed between the electrode body 3 and the rectangular casing 1.

A positive electrode tab 40 and a negative electrode tab 50 are provided on an end portion of the electrode body 3 adjacent to the sealing plate 2. The positive electrode tab 40 is electrically connected to a positive electrode terminal 7 via a second positive electrode current collector 6b and a first positive electrode current collector 6a. The negative electrode tab 50 is electrically connected to a negative electrode terminal 9 via a second negative electrode current collector 8b and a first negative electrode current collector 8a. Here, the first positive electrode current collector 6a and the second positive electrode current collector 6b constitute a positive electrode current collector member 6. The first negative electrode current collector 8a and the second negative electrode current collector 8b constitute a negative electrode current collector member 8. The positive electrode current collector member 6 may be a single component. The negative electrode current collector member 8 may be a single component.

The positive electrode terminal 7 is fixed to the sealing plate 2 with an outer insulator 11 made of a resin interposed therebetween. The negative electrode terminal 9 is fixed to the sealing plate 2 with an outer insulator 13 made of a resin interposed therebetween. The positive electrode terminal 7 is preferably made of a metal, and more preferably made of aluminum or an aluminum alloy. The negative electrode terminal 9 is preferably made of a metal, and more preferably made of copper or a copper alloy.

Preferably, a circuit breaker mechanism 60, which operates when the pressure in the battery case 100 becomes a predetermined pressure or higher to block the conduction path between the positive electrode plate and the positive electrode terminal 7, is disposed in a conduction path between the positive electrode plate and the positive electrode terminal 7. A circuit breaker mechanism may be disposed in a conduction path between the negative electrode plate and the negative electrode terminal 9.

The sealing plate 2 has a gas discharge valve 17 that breaks when the pressure in the battery case 100 becomes a predetermined pressure or higher to discharge gas in the battery case 100 to the outside of the battery case 100. The operation pressure of the gas discharge valve 17 is set higher than the operation pressure of the circuit breaker mechanism 60.

The sealing plate 2 has an electrolyte injection hole 15. After injecting an electrolyte into the battery case 100 from the electrolyte injection hole 15, the electrolyte injection hole 15 is sealed with a sealing plug 16. Preferably, a blind rivet is used as the sealing plug 16.

Next, a method of manufacturing the rectangular secondary battery 20 and details of each component will be described.

[Making of Positive Electrode Plate]

A positive electrode slurry, which includes a lithium nickel cobalt manganese composite oxide as a positive electrode active material, polyvinylidene fluoride (PVdF) as a binder, a carbon material as a conductive agent, and an N-methyl-2-pyrrolidone (NMP) as a dispersion medium, is made. The positive electrode slurry is applied to both surfaces of a rectangular aluminum foil, having a thickness of 15 μm, as a positive electrode core. NMP in the positive electrode slurry is removed by drying this, thereby forming positive electrode active material mixture layers on the positive electrode core. Subsequently, the positive electrode active material mixture layers are each compressed so as to have a predetermined thickness. A positive electrode plate obtained in this way is cut into a predetermined shape.

Figure 3:
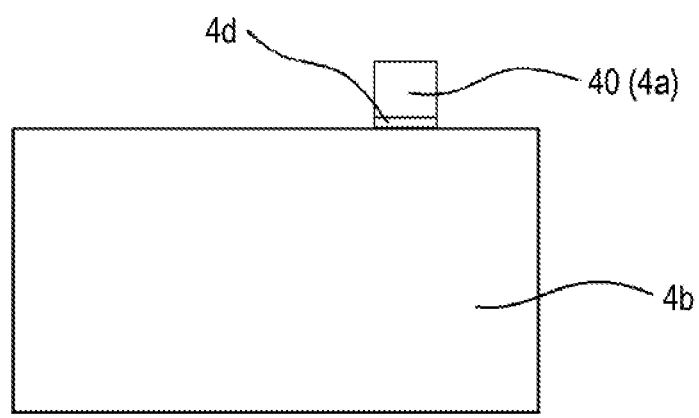
FIG. 3 is a plan view of a positive electrode plate according to the embodiment.

FIG. 3 is a plan view of a positive electrode plate 4 made by using the method described above. As illustrated in FIG. 3, the positive electrode plate 4 has a body in which positive electrode active material mixture layers 4b are formed on both surfaces of a rectangular positive electrode core 4a. The positive electrode core 4a protrudes from an edge of the body, and the protruding positive electrode core 4a constitutes the positive electrode tab 40. The positive electrode tab 40 may be a part of the positive electrode core 4a as illustrated in FIG. 3, or another member may be connected to the positive electrode core 4a to serve as the positive electrode tab 40. Preferably, a positive electrode protection layer 4d, which has higher electric resistance than the positive electrode active material mixture layers 4b, is formed on a part of the positive electrode tab 40 adjacent to the positive electrode active material mixture layers 4b.

[Making of Negative Electrode Plate]

A negative electrode slurry, which includes carbon black as a negative electrode active material, a styrene-butadiene rubber (SBR) as a binder, carboxymethylcellulose (CMC) as a thickener, and water, is made. The negative electrode slurry is applied to both surfaces of a rectangular copper foil, having a thickness of 8 µm, as a negative electrode core. Water in the positive electrode slurry is removed by drying this, thereby forming negative electrode active material mixture layers on the negative electrode core. Subsequently, the negative electrode active material mixture layers are each compressed so as to have a predetermined thickness. The negative electrode plate obtained in this way is cut into a predetermined shape.

Figure 4:
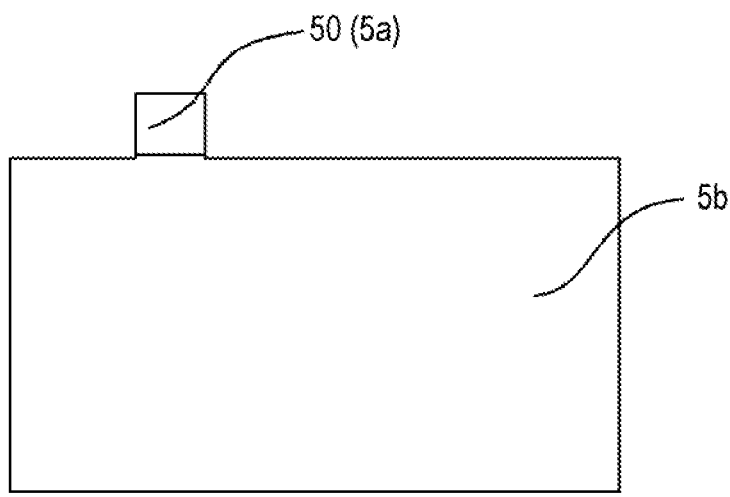
FIG. 4 is a plan view of a negative electrode plate according to the embodiment.

FIG. 4 is a plan view of a negative electrode plate 5 made by using the method described above. As illustrated in FIG. 4, the negative electrode plate 5 has a body in which negative electrode active material mixture layers 5b are formed on both surfaces of a rectangular negative electrode core 5a. The negative electrode core 5a protrudes from an edge of the body, and the protruding negative electrode core 5a constitutes the negative electrode tab 50. The negative electrode tab 50 may be a part of the negative electrode core 5a as illustrated in FIG. 4, or another member may be connected to the negative electrode core 5a to serve as the negative electrode tab 50.

[Making of Electrode Body Element]

Figure 5:
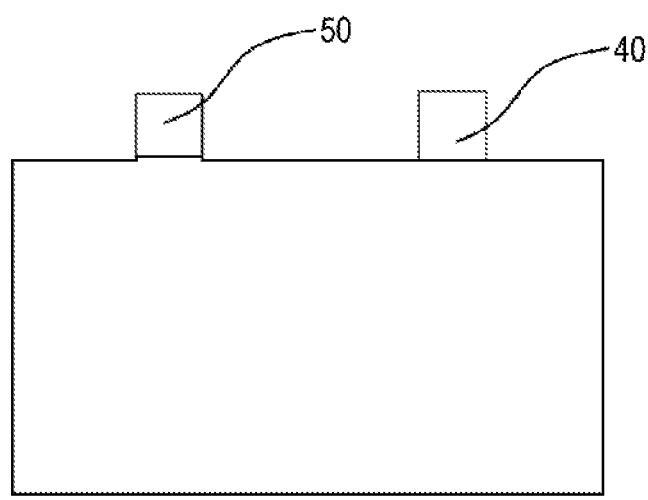
FIG. 5 is a plan view of an electrode body element according to the embodiment.

Fifty positive electrode plates 4 and fifty-one negative electrode plates 5 are made by using the method described above, and a stacked electrode body element (3a, 3b) is made by stacking these plates with rectangular separators made of polyolefin interposed therebetween. As illustrated in FIG. 5, the stacked electrode body element (3a, 3b) is made so that, at one end portion thereof, the positive electrode tabs 40 of the positive electrode plates 4 are stacked and the negative electrode tabs 50 of the negative electrode plates 5 are stacked. Separators are disposed on both outer surfaces of the electrode body element (3a, 3b), and the electrode plates and the separates can be fixed in a stacked state by using a tape or the like. Alternatively, by providing the separators with adhesive layers, the separators and the positive electrode plates 4, and the separators and the negative electrode plates 5 may be respectively bonded to each other.

Preferably, the size of each of the separators in plan view may be equal to or larger that of each of the negative electrode plates 5. The positive electrode plate 4 may be placed between two separators, the edges of the separators may be fused together, and then the positive electrode plates 4 and the negative electrode plates 5 may be stacked. An elongated separator may be used to make the electrode body element (3a, 3b), and the positive electrode plates 4 and the negative electrode plates 5 may be stacked while bending the elongated separator into a zig-zag shape. An elongated separator may be used, and the positive electrode plates 4 and the negative electrode plates 5 may be stacked while rolling up the elongated separator.

[Attachment of Components to Sealing Plate (Positive Electrode Side)]

Figure 6:
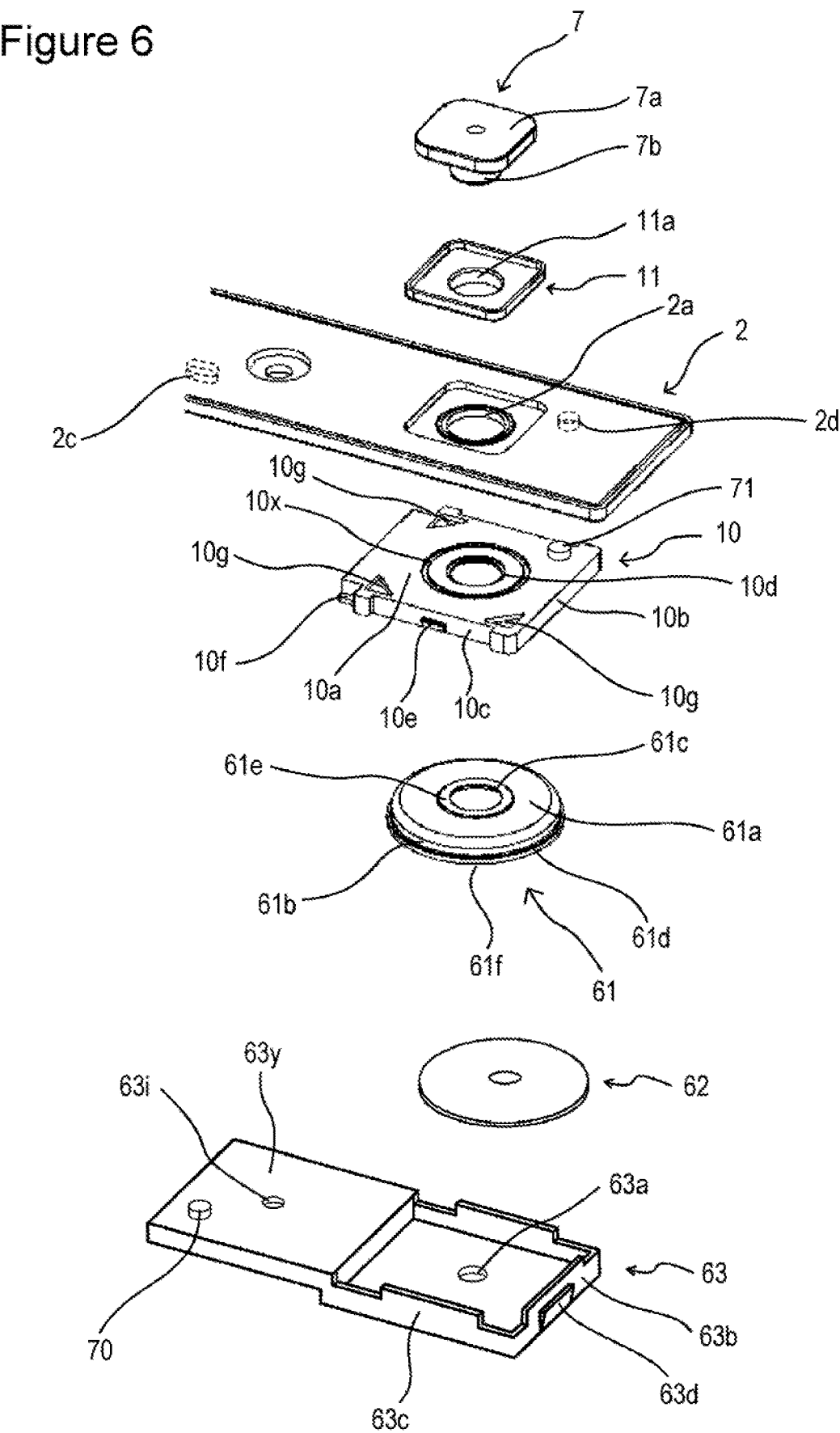
FIG. 6 is a perspective view of a positive electrode terminal, an outer insulator, a sealing plate, a first insulator, and a conductor.
Figure 7:
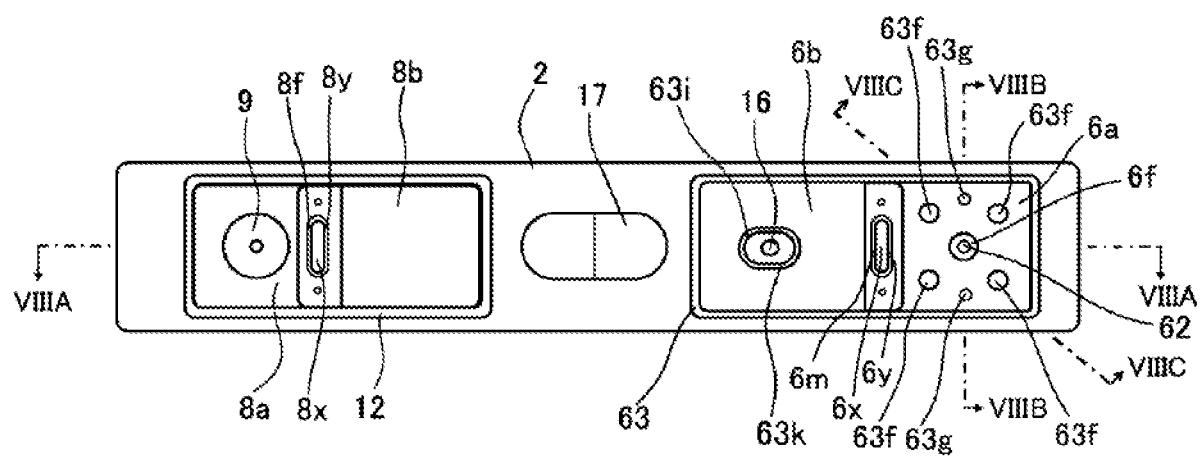
FIG. 7 is a bottom view of the sealing plate after the components have been attached.

Referring to FIGS. 2 and 6 to 8, a method of attaching the positive electrode terminal 7, the first positive electrode current collector 6a, and the like to the sealing plate 2; and the structure of a portion near the positive electrode terminal 7 will be described. FIG. 6 is a perspective view of the positive electrode terminal 7, the outer insulator 11, the sealing plate 2, a first insulator 10, and a conductor 61 before being assembled. FIG. 7 is a bottom view of a surface of the sealing plate 2 inside the battery after the components have been attached. In FIG. 7, the positive electrode tab 40 and the negative electrode tab 50 are not illustrated. FIG. 8A is a sectional view of a portion near the positive electrode terminal 7 taken along line VIIIA-VIIIA in FIG. 7. FIG. 8B is a sectional view of a portion near the positive electrode terminal 7 taken along line VIIIB-VIIIB in FIG. 7. FIG. 8C is a sectional view of a portion near the positive electrode terminal 7 taken along line VIIIC-VIIIC in FIG. 7.

The outer insulator 11 is placed on the surface of the sealing plate 2 outside the battery near a positive electrode terminal attachment hole 2a, and the first insulator 10 and the conductor 61 are placed on a surface of the sealing plate 2 inside the battery near the positive electrode terminal attachment hole 2a. Next, an insertion portion 7b of the positive electrode terminal 7, which is formed on one side of a flange 7a, is inserted into each of a first terminal insertion hole 11a of the outer insulator 11, the positive electrode terminal attachment hole 2a of the sealing plate 2, a second terminal insertion hole 10d of the first insulator 10, and a third terminal insertion hole 61c of the conductor 61. Then, the tip of the insertion portion 7b is upset on the conductor 61. Thus, the positive electrode terminal 7, the outer insulator 11, the sealing plate 2, the first insulator 10, and the conductor 61 are fixed. Because the insertion portion 7b of the positive electrode terminal 7 is upset, an enlarged-diameter portion, which has a larger outside diameter than the third terminal insertion hole 61c of the conductor 61, is formed at the tip the insertion portion 7b. Preferably, the upset part of the insertion portion 7b of the positive electrode terminal 7 and the conductor 61 are welded to each other by laser welding or the like. Preferably, the first insulator 10 and the outer insulator 11 are each made of a resin.

As illustrated in FIGS. 6 and 8, the first insulator 10 has a first insulator body 10a that is disposed so as to face the sealing plate 2. A pair of first side walls 10b are disposed at both end portions of the first insulator body 10a in the longitudinal direction of the sealing plate 2. A pair of second side walls 10c are disposed at both end portions of the first insulator body 10a in the transversal direction of the sealing plate 2. The first insulator body 10a has the second terminal insertion hole 10d. First connection portions 10e are disposed on outer surfaces of the second side walls 10c. Preferably, the first connection portions 10e are disposed at central portions of the second side walls 10c in the longitudinal direction of the sealing plate 2. Second connection portions 10f are disposed on the outer surfaces of the second side walls 10c. Preferably, the second connection portions 10f are disposed at end portions of the second side walls 10c in the longitudinal direction of the sealing plate 2. A surface of the first insulator body 10a on the sealing plate 2 side has a first groove 10x, and a surface of the first insulator body 10a on the conductor 61 side has a second groove 10y. The second groove 10y is located further outward than the first groove 10x. The surface of the first insulator body 10a on the sealing plate 2 side has recesses 10g at corners thereof.

As illustrated in FIGS. 6 and 8, the conductor 61 has a conductor base 61a, which is disposed so as to face the first insulator body 10a, and a tubular portion 61b, which extends from the edge of the conductor base 61a toward the electrode body 3. The cross-sectional shape of the tubular portion 61b parallel to the sealing plate 2 may be a circular shape or a polygonal shape. A flange 61d is disposed at an end portion of the tubular portion 61b on the electrode body 3 side. The tubular portion 61b has a conductor opening 61f at an end portion thereof on the electrode body 3 side. A pressing protrusion 61e protrudes from a surface of the conductor base 61a that faces the first insulator 10. The pressing protrusion 61e presses the first insulator 10 toward the sealing plate 2. Preferably, the pressing protrusion 61e is formed at the edge of the third terminal insertion hole 61c or near the edge.

Next, a deformable plate 62 is placed so as to close the conductor opening 61f of the conductor 61, and the edge of the deformable plate 62 is welded to the conductor 61 by laser welding or the like. Thus, the conductor opening 61f of the conductor 61 is tightly sealed by the deformable plate 62. The conductor 61 and the deformable plate 62 are each preferably made of a metal, and more preferably made of aluminum or an aluminum alloy.

Figure 9:
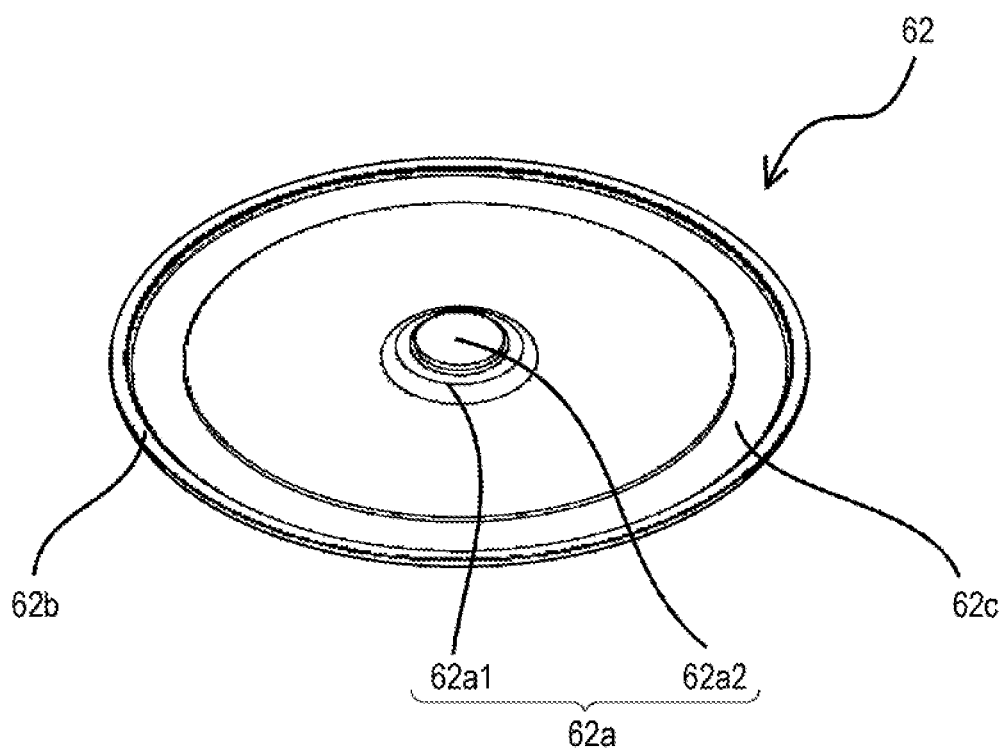
FIG. 9 is a perspective view of a deformable plate.

FIG. 9 is a perspective view of the deformable plate 62. In FIG. 9, the upper side is the electrode body 3 side, and the lower side is the sealing plate 2 side. As illustrated in FIG. 9, a stepped protrusion 62a, which protrudes toward the electrode body 3, is formed at a central portion of the deformable plate 62. The stepped protrusion 62a includes a first protrusion 62a1 and a second protrusion 62a2, which has a smaller outside diameter than the first protrusion 62a1 and which protrudes from the first protrusion 62a1 toward the electrode body 3. The deformable plate 62 has an annular rib 62b, which protrudes toward the electrode body 3, at the outer edge thereof. The deformable plate 62 has an annular thin portion 62c in a surface thereof on the electrode body 3 side. The deformable plate 62 may have any appropriate shape, as long as the deformable plate 62 can seal the conductor opening 61f of the conductor 61.

Next, referring to FIG. 10, a method of fixing a second insulator 63 and the first positive electrode current collector 6a will be described. In FIG. 10, a surface disposed on the electrode body 3 side in the rectangular secondary battery 20 is located at an upper position, and a surface disposed on the sealing plate 2 side is located at a lower position.

Figure 10A:
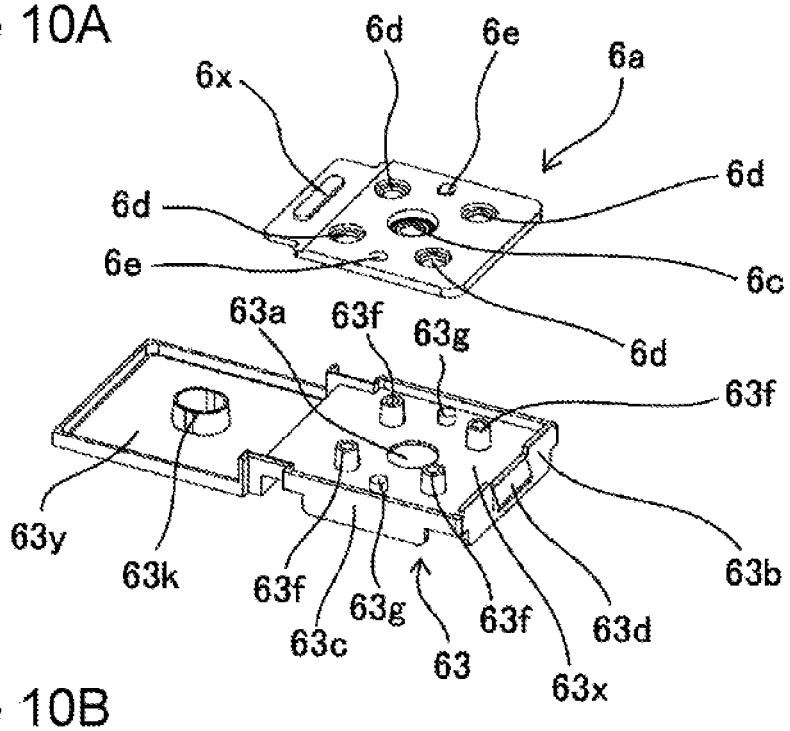
FIG. 10A is a perspective view of a first positive electrode current collector and a second insulator before being assembled.

As illustrated in FIG. 10A, the first positive electrode current collector 6a has a connection hole 6c. The edge of the connection hole 6c is welded to the deformable plate 62. The first positive electrode current collector 6a has four fixing holes 6d around the connection hole 6c. The number of fixing hole 6d may be one. However, preferably, the number of fixing holes 6d is two or more. The first positive electrode current collector 6a has displacement prevention holes 6e around the connection hole 6c. The number of displacement prevention hole 6e may be one. However, preferably, the number of displacement prevention holes 6e is at least two. Preferably, the displacement prevention holes 6e are disposed between the fixing holes 6d. Preferably, the fixing holes 6d each have a small-diameter portion 6d1 and a large-diameter portion 6d2, which has a larger inside diameter than the small-diameter portion 6d1. Preferably, the large-diameter portion 6d2 is disposed nearer than the small-diameter portion 6d1 to the electrode body 3.

As illustrated in FIGS. 8 and 10A, the second insulator 63 has an insulator first region 63x that is disposed so as to face the deformable plate 62, an insulator second region 63y that is disposed so as to face the sealing plate 2, and an insulator third region 63z that connects the insulator first region 63x and the insulator second region 63y. The insulator first region 63x has an insulator first opening 63a at the center thereof. A third wall portion 63b is disposed at an end portion of the insulator first region 63x in the longitudinal direction of the sealing plate 2. A third connection portion 63d is formed on the third wall portion 63b. Fourth wall portions 63c are disposed at both end portions of the insulator first region 63x in the transversal direction of the sealing plate 2. Fourth connection portions 63e are formed on the fourth wall portions 63c. Four fixing protrusions 63f protrude from a surface of the insulator first region 63x on the electrode body 3 side. Two displacement prevention protrusions 63g protrude from the surface. Four claw portions 63h are formed on a surface of the insulator first region 63x on the sealing plate 2 side. The insulator second region 63y is disposed nearer than the insulator first region 63x to the sealing plate 2. The insulator second region 63y has an insulator second opening 63i at a position facing the electrolyte injection hole 15 of the sealing plate 2. An insulator annular rib 63k, which extends toward the electrode body 3, is disposed at the edge of the insulator second opening 63i.

Figure 10B:
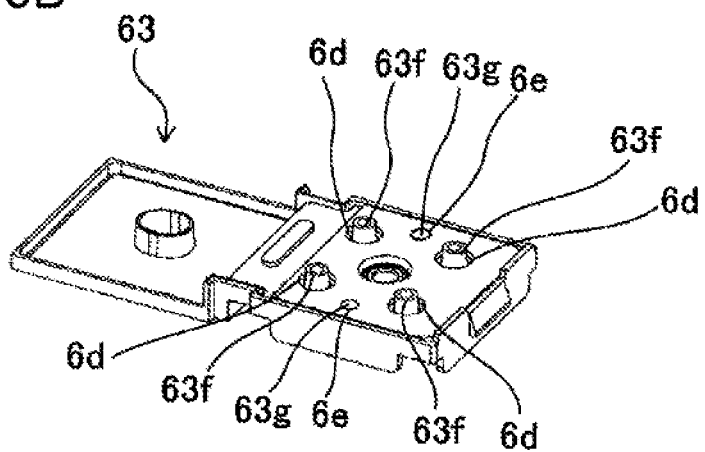
FIG. 10B is a perspective view of the first positive electrode current collector and the second insulator after having been assembled.
Figure 10C:
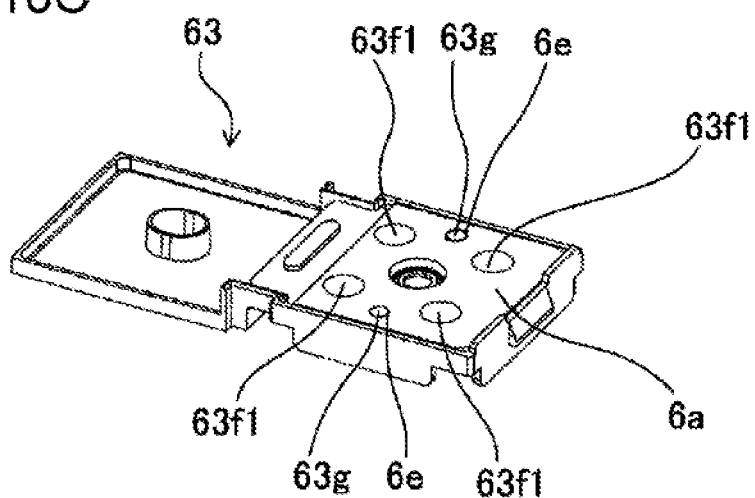
FIG. 10C is a perspective view of the first positive electrode current collector and the second insulator after having been fixed.

As illustrated in FIG. 10B, the first positive electrode current collector 6a is placed on the second insulator 63 so that the fixing protrusions 63f of the second insulator 63 are placed in the fixing holes 6d of the first positive electrode current collector 6a and the displacement prevention protrusions 63g of the second insulator 63 are placed in the displacement prevention holes 6e of the first positive electrode current collector 6a. The tips of the fixing protrusions 63f of the second insulator 63 are deformed by thermally upsetting these tips. Thus, as illustrated in FIGS. 8C and 10C, enlarged-diameter portions 63f1 are formed at the tips of the fixing protrusions 63f of the second insulator 63, and the second insulator 63 and the first positive electrode current collector 6a are fixed.

Figure 8A:
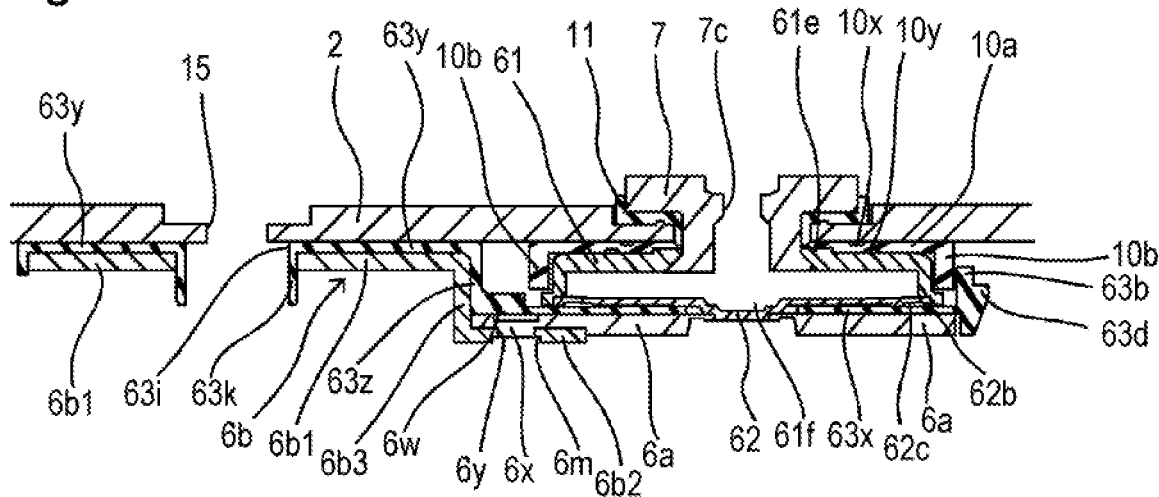
FIG. 8A is a sectional view taken along line VIIIA-VIIIA in FIG. 7.
Figure 8B:
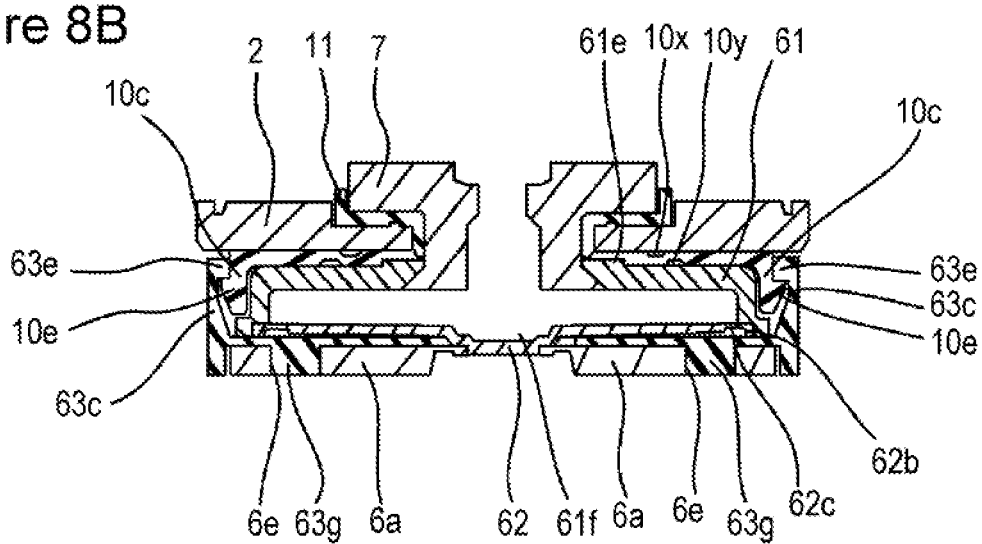
FIG. 8B is a sectional view taken along line VIIIB-VIIIB in FIG. 7.
Figure 8C:
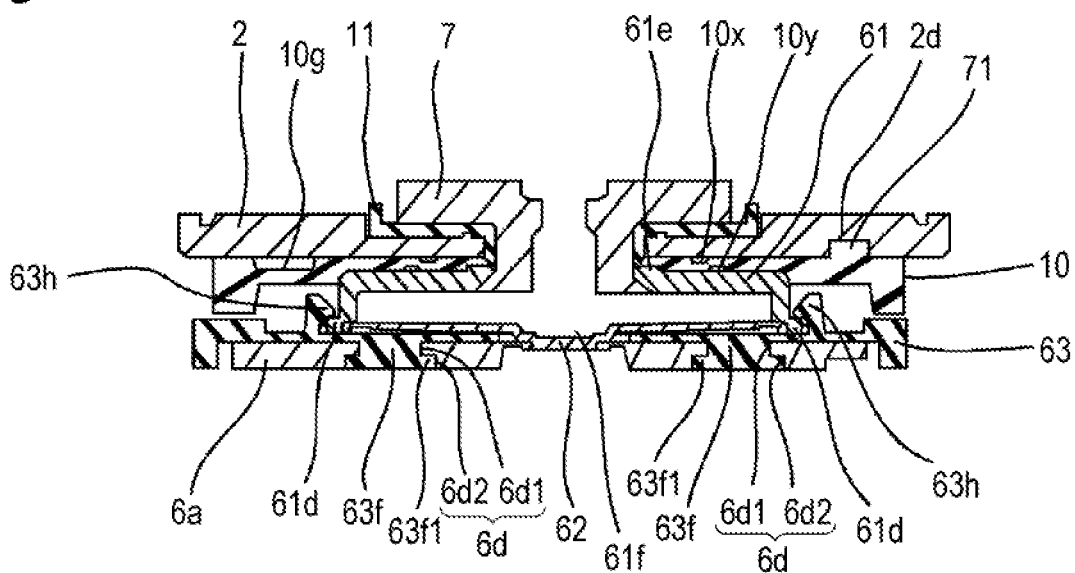
FIG. 8C is a sectional view taken along line VIIIC-VIIIC in FIG. 7.

Preferably, as illustrated in FIG. 8C, the enlarged-diameter portions 63f1, which are formed at the tips of the fixing protrusions 63f of the second insulator 63, are disposed in the large-diameter portions 6d2 of the fixing holes 6d.

The displacement prevention protrusions 63g of the second insulator 63 are not thermally upset, in contrast to the fixing protrusions 63f.

Preferably, the outside diameter of each of the fixing protrusions 63f is larger than the outside diameter of each of the displacement prevention protrusions 63g. Preferably, the inside diameter of each of the small-diameter portions 6d1 of the fixing holes 6d of the first positive electrode current collector 6a is larger than the inside diameter of each of the displacement prevention holes 6e of the first positive electrode current collector 6a.

Next, as illustrated in FIGS. 8A to 8C, the second insulator 63, to which the first positive electrode current collector 6a has been fixed, is connected to the first insulator 10 and the conductor 61.

As illustrated in FIG. 8B, the fourth connection portions 63e of the second insulator 63 are connected to the first connection portions 10e of the first insulator 10. As illustrated in FIG. 8C, the claw portions 63h of the second insulator 63 are connected to the flange 61d of the conductor 61. Thus, the second insulator 63 is connected to each of the first insulator 10 and the conductor 61. The second insulator 63 need not be connected to both of the first insulator 10 and the conductor 61. However, preferably, the second insulator 63 is connected to at least one of the first insulator 10 and the conductor 61. Thus, it is possible to suppress application of a load to a fragile part of the first positive electrode current collector 6a even when a strong impact or vibration is applied to the rectangular secondary battery 20. Thus, it is possible to suppress damage or breakage of a fragile part of the first positive electrode current collector 6a.

Figure 11:
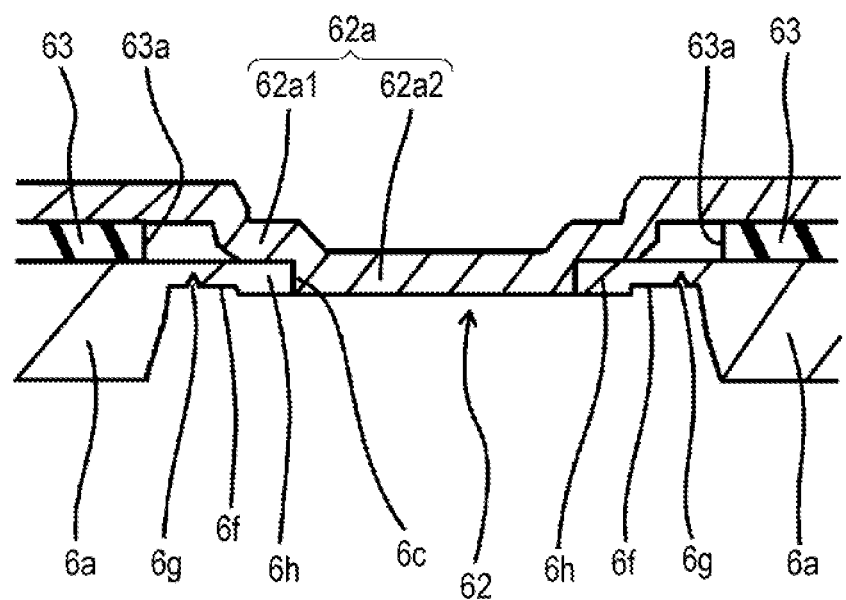
FIG. 11 is an enlarged view of a portion near a connection portion between the deformable plate and the first positive electrode current collector in FIG. 8A.

The deformable plate 62 is welded to the first positive electrode current collector 6a. FIG. 11 is an enlarged view of a portion near a connection portion between the deformable plate 62 and the first positive electrode current collector 6a in FIG. 8A. As illustrated in FIG. 11, the second protrusion 62a2 of the deformable plate 62 is placed in the connection hole 6c of the first positive electrode current collector 6a. The second protrusion 62a2 of the deformable plate 62 and the edge of the connection hole 6c of the first positive electrode current collector 6a are welded to each other by laser welding or the like. The connection portion between the deformable plate 62 and the first positive electrode current collector 6a is formed at a position corresponding to the insulator first opening 63a of the second insulator 63.

A thin portion 6f is formed in the first positive electrode current collector 6a around the connection hole 6c. An annular notch 6g is formed in the thin portion 6f so as to surround the connection hole 6c. An annular connection rib 6h is formed at the edge of the connection hole 6c. The connection rib 6h and the deformable plate 62 are welded to each other. The first positive electrode current collector 6a and the deformable plate 62 may be welded in an annular shape around the entire periphery of the connection hole 6c, or may have an unwelded part, instead of being welded in an annular shape. The first positive electrode current collector 6a and the deformable plate 62 may be welded along the edge of the connection hole 6c at a plurality of positions that are separated from each other.

Here, the operation of the circuit breaker mechanism 60 will be described. As the pressure in the battery case 100 increases, a central portion of the deformable plate 62 deforms so as to move toward the sealing plate 2 side. When the pressure in the battery case 100 becomes a predetermined pressure or higher, due to the deformation of the deformable plate 62, the notch 6g of the thin portion 6f of the first positive electrode current collector 6a breaks. Thus, the conduction path from the positive electrode plate 4 to the positive electrode terminal 7 is cut. As described above, the circuit breaker mechanism 60 includes the first positive electrode current collector 6a, the deformable plate 62, and the conductor 61. When the rectangular secondary battery 20 becomes overcharged and the pressure in the battery case 100 increases, the circuit breaker mechanism 60 operates to cut the conduction path from the positive electrode plate 4 to the positive electrode terminal 7, thereby preventing further overcharging. The operation pressure at which the circuit breaker mechanism 60 operates may be appropriately determined.

Before welding the deformable plate 62 and the first positive electrode current collector 6a to each other, by supplying a gas to the inside of the conductor 61 through a terminal through-hole 7c formed in the positive electrode terminal 7, it is possible to perform a leakage test of the welded part between the conductor 61 and the deformable plate 62. The terminal through-hole 7c is sealed by a terminal sealing member 7x. Preferably, the terminal sealing member 7x is composed of a metal member 7y and a rubber member 7z.

Figure 12:
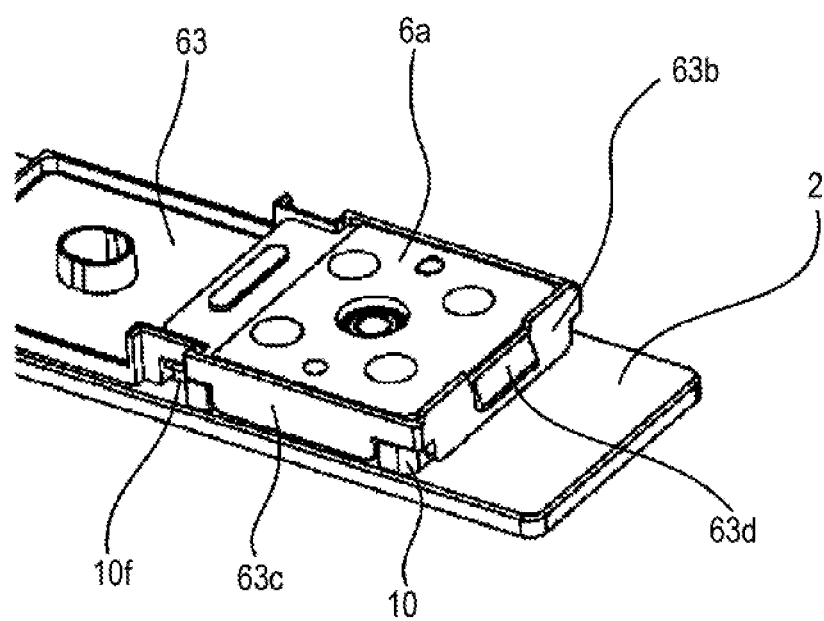
FIG. 12 is a perspective view of the sealing plate to which the components are attached.

FIG. 12 is a perspective view of the sealing plate 2 to which the first insulator 10, the conductor 61, the deformable plate 62, the second insulator 63, and the first positive electrode current collector 6a are attached. As illustrated in FIG. 12, the third connection portion 63d is formed at an end portion of the second insulator 63 in the longitudinal direction of the sealing plate 2. The second connection portions 10f are formed at both ends of the first insulator 10 in the transversal direction of the sealing plate 2.

[Attachment of Components to Sealing Plate (Negative Electrode Side)]

Figure 13:
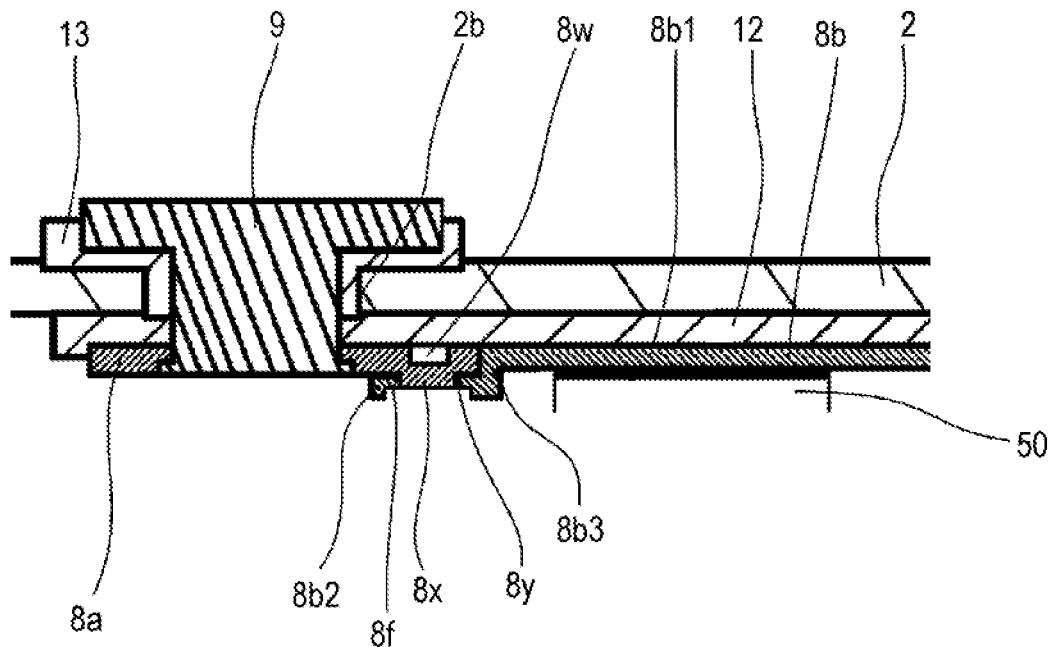
FIG. 13 is a longitudinal sectional view of a portion of the sealing plate near the negative electrode terminal.

Referring to FIGS. 2 and 13, a method of attaching the negative electrode terminal 9 and the first negative electrode current collector 8a to the sealing plate 2 will be described. The outer insulator 13 is placed on a surface of the sealing plate 2 outside the battery near a negative electrode terminal attachment hole 2b. An inner insulator 12 and the first negative electrode current collector 8a are placed on a surface of the sealing plate 2 inside the battery near the negative electrode terminal attachment hole 2b. Next, the negative electrode terminal 9 is inserted into each of a through-hole of the outer insulator 13, the negative electrode terminal attachment hole 2b of the sealing plate 2, a through-hole of the inner insulator 12, and a through-hole of the first negative electrode current collector 8a. The tip of the negative electrode terminal 9 is upset on the first negative electrode current collector 8a. Thus, the outer insulator 13, the sealing plate 2, the inner insulator 12, and the first negative electrode current collector 8a are fixed. Preferably, the upset part of the negative electrode terminal 9 and the first negative electrode current collector 8a are welded to each other by laser welding or the like. Preferably, the inner insulator 12 and the outer insulator 13 are each made of a resin.

[Connection of Current Collector and Tab]

Figure 14:
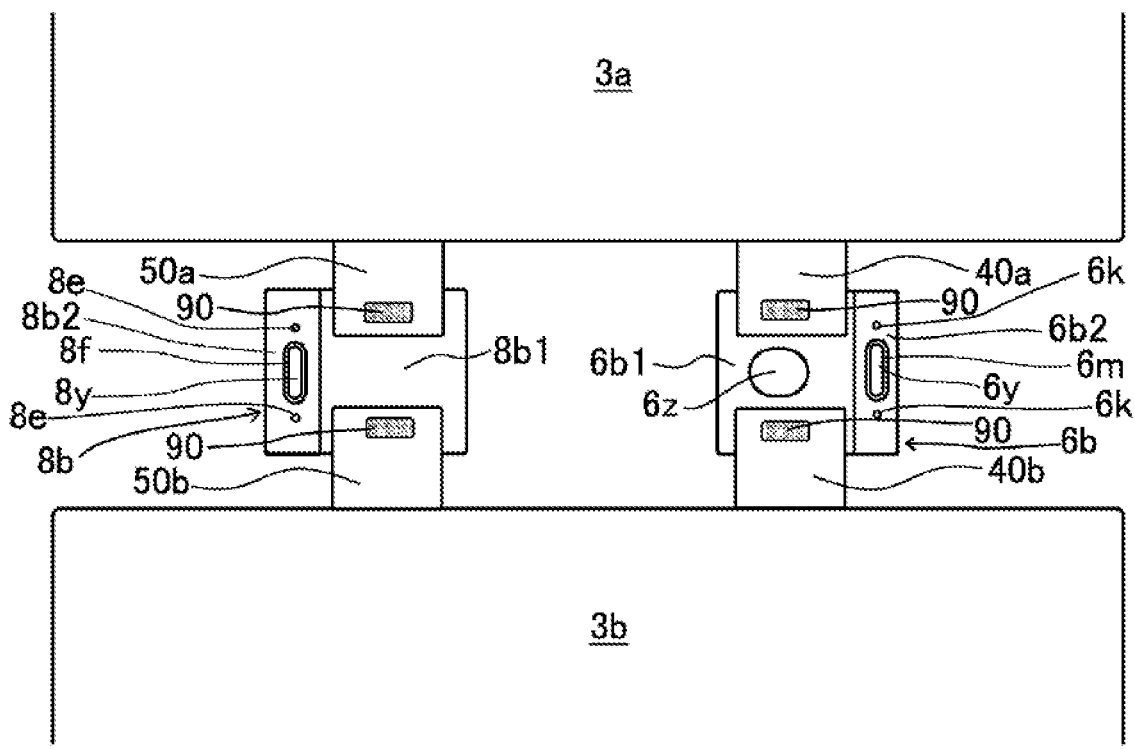
FIG. 14 illustrates a method of attaching tabs to current collector members.

FIG. 14 illustrates a method of connecting the positive electrode tab 40 to the second positive electrode current collector 6b, and a method of connecting the negative electrode tab 50 to the second negative electrode current collector 8b. Two electrode body elements are made by using the methods, and the electrode body elements will be respectively referred to as the first electrode body element 3a and the second electrode body element 3b. The first electrode body element 3a and the second electrode body element 3b may have exactly the same structure or may have different structures. Here, a plurality of positive electrode tabs 40 of the first electrode body element 3a constitute a first positive electrode tab group 40a. A plurality of negative electrode tabs 50 of the first electrode body element 3a constitute a first negative electrode tab group 50a. A plurality of positive electrode tabs 40 of the second electrode body element 3b constitute a second positive electrode tab group 40b. A plurality of negative electrode tabs 50 of the second electrode body element 3b constitute a second negative electrode tab group 50b.

The second positive electrode current collector 6b and the second negative electrode current collector 8b are placed between the first electrode body element 3a and the second electrode body element 3b. Then, the first positive electrode tab group 40a, which is composed of a plurality of positive electrode tabs 40 that are stacked and protrude from the first electrode body element 3a, is placed on the second positive electrode current collector 6b; and the first negative electrode tab group 50a, which is composed of a plurality of negative electrode tabs 50 that are stacked and protrude from the first electrode body element 3a, is placed on the second negative electrode current collector 8b. The second positive electrode tab group 40b, which is composed of a plurality of positive electrode tabs 40 that are stacked and protrude from the second electrode body element 3b, is placed on the second positive electrode current collector 6b; and the second negative electrode tab group 50b, which is composed of a plurality of negative electrode tabs 50 that are stacked and protrude from the second electrode body element 3b, is placed on the second negative electrode current collector 8b. The first positive electrode tab group 40a and the second positive electrode tab group 40b are welded to the second positive electrode current collector 6b, and welds 90 are formed. The first negative electrode tab group 50a and the second negative electrode tab group 50b are each welded to the second negative electrode current collector 8b, and welds 90 are formed. Welding can be performed as follows.

Welding is performed by vertically clamping the stacked tabs (the first positive electrode tab group 40a, the second positive electrode tab group 40b, the first negative electrode tab group 50a, and the second negative electrode tab group 50b) and the current collectors (the second positive electrode current collector 6b and the second negative electrode current collector 8b) by using welding jigs. Preferably, a welding method used here is ultrasonic welding or resistance welding. The welding jigs, which are paired, are a pair of resistance welding electrodes in the case where resistance welding is performed, and a horn and an anvil in the case where ultrasonic welding is performed. The tabs (the first positive electrode tab group 40a, the second positive electrode tab group 40b, the first negative electrode tab group 50a, and the second negative electrode tab group 50b) and the current collectors (the second positive electrode current collector 6b and the second negative electrode current collector 8b) may be connected by laser welding.

As illustrated in FIG. 14, the second positive electrode current collector 6b has a current collector first region 6b1 and a current collector second region 6b2. The positive electrode tab 40 is connected to the current collector first region 6b1. The current collector first region 6b1 has a current collector second opening 6z. The current collector first region 6b1 and the current collector second region 6b2 are connected to each other via a current collector third region 6b3. After connecting the second positive electrode current collector 6b to the first positive electrode current collector 6a, the current collector second opening 6z is placed at a position corresponding to the electrolyte injection hole 15 of the sealing plate 2. The current collector second region 6b2 has a current collector first opening 6y. A current collector first recess 6m is formed around the current collector first opening 6y. Target holes 6k are formed on both sides of the current collector first opening 6y in the transversal direction of the sealing plate 2.

As illustrated in FIG. 14, the second negative electrode current collector 8b has a current collector first region 8b1 and a current collector second region 8b2. The negative electrode tab 50 is connected to the current collector first region 8b1. The current collector second region 8b2 has a current collector first opening 8y. A current collector first recess 8f is formed around the current collector first opening 8y. Target holes 8e are formed on both sides of the current collector first opening 8y in the transversal direction of the sealing plate 2.

[Connection of First Positive Electrode Current Collector and Second Positive Electrode Current Collector]

As illustrated in FIGS. 2, 7, 8, and other figures, the second positive electrode current collector 6b is placed on the second insulator 63 so that a current collector protrusion 6x of the first positive electrode current collector 6a is located in the current collector first opening 6y of the second positive electrode current collector 6b. Then, the current collector protrusion 6x of the first positive electrode current collector 6a and the edge of the current collector first opening 6y of the second positive electrode current collector 6b are welded to each other by irradiation of an energy beam such as a laser beam. Thus, the first positive electrode current collector 6a and the second positive electrode current collector 6b are connected. Preferably, in the current collector first recess 6m, the first positive electrode current collector 6a and the second positive electrode current collector 6b are welded to each other.

As illustrated in FIGS. 2 and 8, in a direction perpendicular to the sealing plate 2, the distance between the sealing plate 2 and the current collector first region 6b1 is smaller than the distance between the sealing plate 2 and the current collector second region 6b2. With such a structure, the space occupied by the current collector portion can be reduced, and the rectangular secondary battery can have higher volume energy density.

Preferably, the target holes 6k are used as targets for image correction, when welding the first positive electrode current collector 6a and the second positive electrode current collector 6b by irradiation of an energy beam such as a laser beam.

As illustrated in FIG. 8A, a current collector second recess 6w is formed in a surface of the first positive electrode current collector 6a that faces the second insulator 63 and that is on the back side of the current collector protrusion 6x. This is preferable, because it becomes easy to form a larger weld between the first positive electrode current collector 6a and the second positive electrode current collector 6b. Moreover, because the current collector second recess 6w is formed, when welding the first positive electrode current collector 6a and the second positive electrode current collector 6b to each other, it is possible to prevent thermal damage to the second insulator 63 during welding.

[Connection of First Negative Electrode Current Collector and Second Negative Electrode Current Collector]

As illustrated in FIG. 13, the second negative electrode current collector 8b has the current collector first region 8b1 and the current collector second region 8b2. The negative electrode tab 50 is connected to the current collector first region 8b1. The current collector second region 8b2 has the current collector first opening 8y. The current collector first region 8b1 and the current collector second region 8b2 are connected to each other via a current collector third region 8b3.

As illustrated in FIG. 13, the second negative electrode current collector 8b is placed on the inner insulator 12 so that a current collector protrusion 8x of the first negative electrode current collector 8a is located in the current collector first opening 8y of the second negative electrode current collector 8b. Then, the current collector protrusion 8x of the first negative electrode current collector 8a and the edge of the current collector first opening 8y of the second negative electrode current collector 8b are welded to each other by irradiation of an energy beam such as a laser beam. Thus, the first negative electrode current collector 8a and the second negative electrode current collector 8b are connected. Preferably, in the current collector first recess 8f, the first negative electrode current collector 8a, and the second negative electrode current collector 8b are welded to each other. The second negative electrode current collector 8b has the target holes 8e, as with the second positive electrode current collector 6b. In the direction perpendicular to the sealing plate 2, the distance between the sealing plate 2 and the current collector first region 8*b*1 is smaller than the distance between the sealing plate 2 and the current collector second region 8*b*2. The second negative electrode current collector 8*b* may be connected to the negative electrode terminal 9 without using the first negative electrode current collector 8*a*.

As illustrated in FIG. 13, a current collector second recess 8*w* is formed in a surface of the first negative electrode current collector 8*a* that faces the inner insulator 12 and that is on the back side of the current collector protrusion 8*x*. This is preferable, because it becomes easy to form a larger weld between the first negative electrode current collector 8*a* and the second negative electrode current collector 8*b*. Moreover, because the current collector second recess 8*w* is formed, when welding the first negative electrode current collector 8*a* and the second negative electrode current collector 8*b* to each other, it is possible to prevent thermal damage to the inner insulator 12 during welding.

The shape of each of the current collector protrusion 6*x* and the current collector protrusion 8*x* in plan view is preferably a non-circular shape, and preferably a rectangular shape, an elliptical shape, or an oval-track shape.

[Bending of Tab and Making of Electrode Body]

Figure 15A:
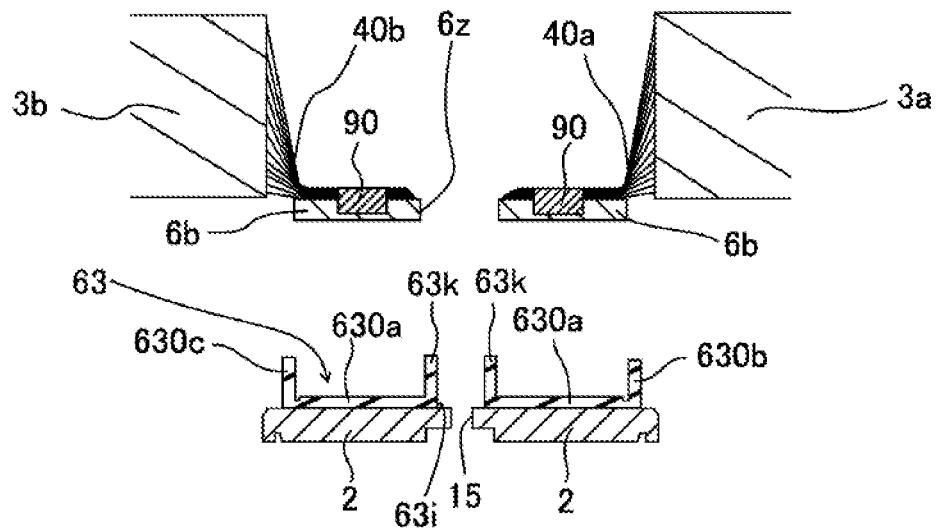
FIG. 15 illustrates a step of placing a second positive electrode current collector on the sealing plate with the second insulator interposed therebetween.
Figure 15B:
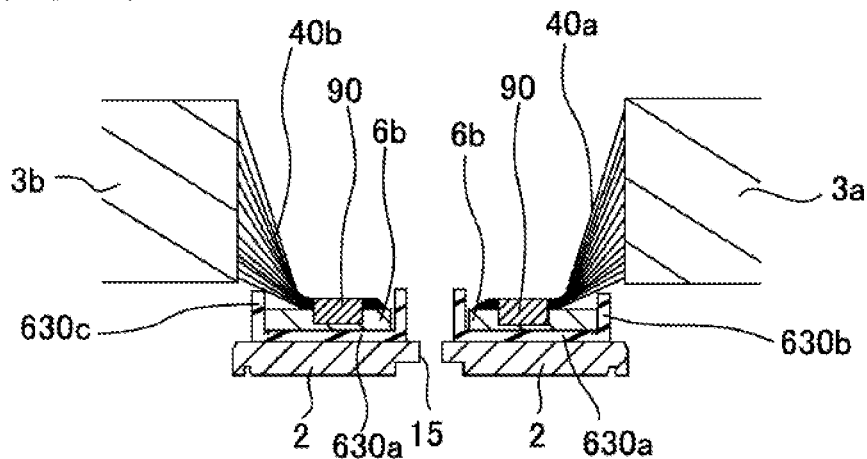
Figure 15C:
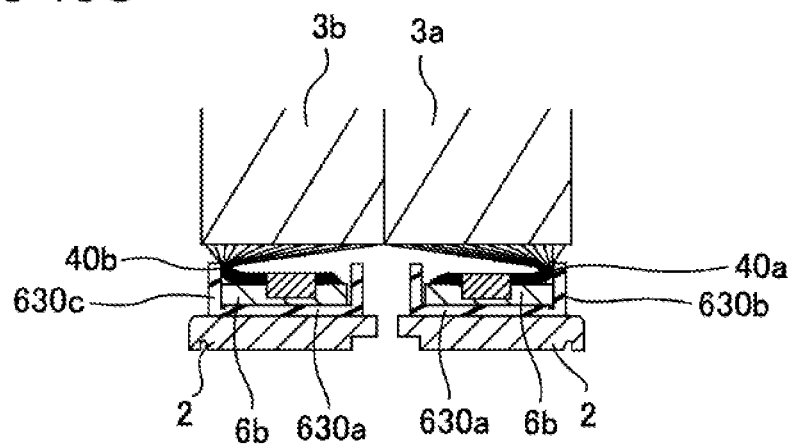

FIGS. 15A to 15C illustrate a step of placing the second positive electrode current collector 6*b*, to which the first positive electrode tab group 40*a* of the first electrode body element 3*a* and the second positive electrode tab group 40*b* of the second electrode body element 3*b* are connected, on the sealing plate 2 with the second insulator 63 interposed therebetween.

As illustrated in FIG. 15A, the second insulator 63 is placed on the surface of the sealing plate 2 inside the battery. Here, the second insulator 63 has a base portion 630*a* (corresponding to the insulator second region 63*y* described above). A first wall portion 630*b*, which extends in a direction away from the sealing plate 2, is disposed at one end portion of the base portion 630*a* in the transversal direction of the sealing plate 2; and a second wall portion 630*c*, which extends in the direction away from the sealing plate 2, is disposed at the other end portion of the base portion 630*a* in the transversal direction of the sealing plate 2. The base portion 630*a* has the insulator second opening 63*i* at a position facing the electrolyte injection hole 15 of the sealing plate 2. The insulator annular rib 63*k*, which extends in the direction away from the sealing plate 2, is disposed around the insulator second opening 63*i*.

Next, as illustrated in FIG. 15B, the second positive electrode current collector 6*b* is placed on the sealing plate 2 with the second insulator 63 interposed therebetween. The base portion 630*a* of the second insulator 63 is placed between the second positive electrode current collector 6*b* and the sealing plate 2. The first wall portion 630*b* and the second wall portion 630*c* respectively protrude further in the direction away from the sealing plate 2 than a surface of the second positive electrode current collector 6*b* to which the first positive electrode tab group 40*a* and the second positive electrode tab group 40*b* are connected. After entering the state shown in FIG. 15B, the second positive electrode current collector 6*b* is welded to the first positive electrode current collector 6*a*.

Next, as illustrated in FIG. 15C, the first positive electrode tab group 40*a* and the second positive electrode tab group 40*b* are bent so that the first electrode body element 3*a* and the second electrode body element 3*b* are integrated. Here, the first positive electrode tab group 40*a* and the second positive electrode tab group 40*b* are bent in different directions.

The first positive electrode tab group 40*a* is connected to a region of the second positive electrode current collector 6*b*, the region being disposed along the sealing plate 2. The tip of the first positive electrode tab group 40*a* is located on the central side in the transversal direction of the sealing plate 2. The first positive electrode tab group 40*a* is bent at a position near the first wall portion 630*b* and connected to each of the positive electrode plates. An outer surface of the first positive electrode tab group 40*a* on the first wall portion 630*b* side is in contact with an inner side surface of the first wall portion 630*b* (a side surface on the central side in the transversal direction of the sealing plate 2).

The second positive electrode tab group 40*b* is connected to a region of the second positive electrode current collector 6*b*, the region being disposed along the sealing plate 2. The tip of the second positive electrode tab group 40*b* is located on the central side in the transversal direction of the sealing plate 2. The second positive electrode tab group 40*b* is bent at a position near the second wall portion 630*c* and connected to each of the positive electrode plates. An outer surface of the second positive electrode tab group 40*b* on the second wall portion 630*c* side is in contact with an inner side surface of the second wall portion 630*c* (a side surface on the central side in the transversal direction of the sealing plate 2).

The outer surface of the first positive electrode tab group 40*a* on the first wall portion 630*b* side is in contact with the inner side surface of the first wall portion 630*b*, and the outer surface of the second positive electrode tab group 40*b* on the second wall portion 630*c* side is in contact with the inner side surface of the second wall portion 630*c*. With such a structure, the first positive electrode tab group 40*a* or the second positive electrode tab group 40*b* is bent in an intended shape. Accordingly, it is possible to more effectively prevent the first positive electrode tab group 40*a* or the second positive electrode tab group 40*b*, which are bent, from protruding outward in the transversal direction of the sealing plate 2, from being bent in an unintended shape, and from being sharply bent. If, for example, the first positive electrode tab group 40*a* or the second positive electrode tab group 40*b* protrudes outward in the transversal direction of the sealing plate 2, is bent in an unintended shape, or is sharply bent, the positive electrode tab 40 may break, may be damaged, or may cause an unintended short circuit. If the first positive electrode tab group 40*a* or the second positive electrode tab group 40*b* protrudes outward in the transversal direction of the sealing plate 2, the tab group 40*a* or 40*b* may make it less easy to insert the electrode body 3 into the rectangular casing 1.

Preferably, the negative electrode side has a structure similar to that of the positive electrode side. Preferably, the inner insulator 12 has a base portion that is disposed between the sealing plate 2 and the second negative electrode current collector 8*b*, and wall portions that are disposed on the base portion and extend in the direction away from the sealing plate 2. Preferably, the first negative electrode tab group 50*a* and the second negative electrode tab group 50*b* are respectively brought into contact with inner side surfaces of the wall portions.

Preferably, the first electrode body element 3*a* and the second electrode body element 3*b* are integrated by using a tape or the like. Alternatively, preferably, the first electrode body element 3*a* and the second electrode body element 3*b* are placed in the insulation sheet 14 that has been formed into a box-like shape or a bag-like shape to be integrated.

Alternatively, preferably, the first electrode body element 3*a* and the second electrode body element 3*b* may be fixed by using an adhesive.

[Attachment of Cover Portion]

After connecting the second positive electrode current collector 6*b* to the first positive electrode current collector 6*a* and connecting the second negative electrode current collector 8*b* to the first negative electrode current collector 8*a*, and before integrating the first electrode body element 3*a* and the second electrode body element 3*b*, preferably, a cover portion 80, which is made of a resin, is connected to the first insulator 10 and the second insulator 63. The cover portion 80 is not essential and may be omitted. As illustrated in FIG. 2, in the rectangular secondary battery 20, the cover portion 80 is disposed between the first positive electrode current collector 6*a* and the electrode body 3. The cover portion 80 is connected to the second connection portions 10*f* of the first insulator 10 and the third connection portion 63*d* of the second insulator 63. Preferably, the cover portion 80 is connected to at least one of the first insulator 10 and the second insulator 63.

[Regarding Rectangular Secondary Battery 20]

Figure 16:
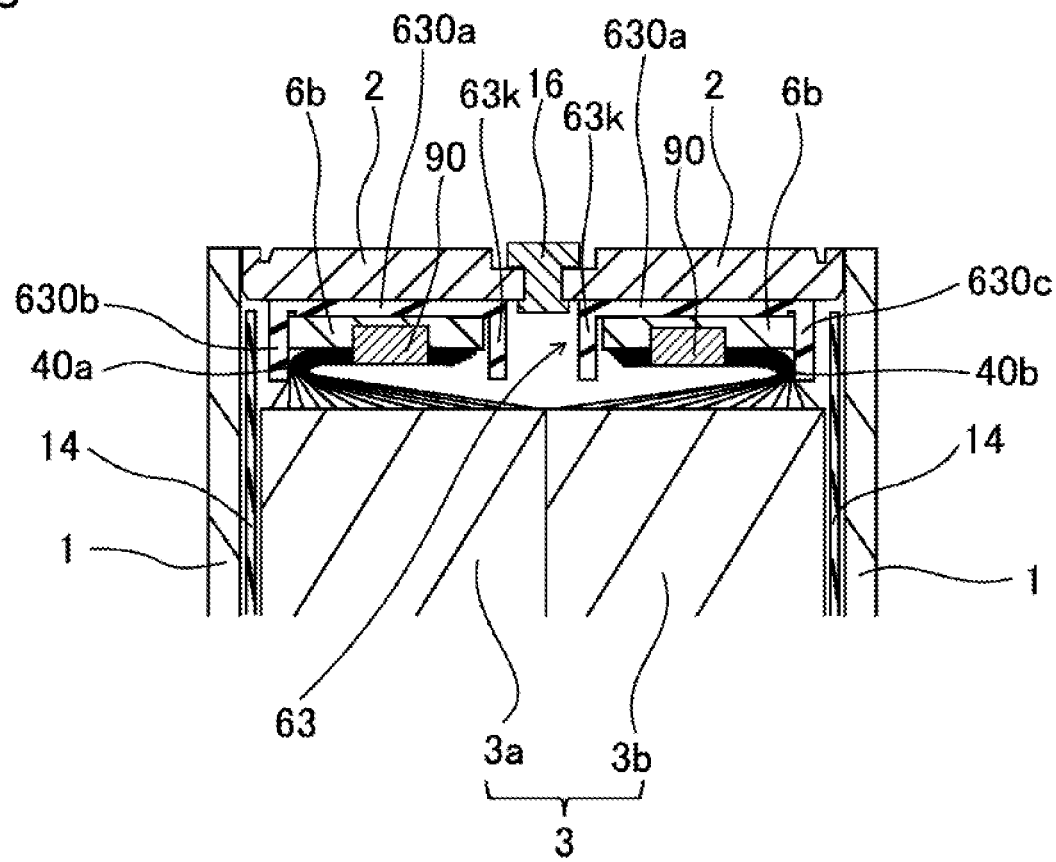
FIG. 16 is a sectional view of a portion near the sealing plate taken along line XVI-XVI in FIG. 1.

FIG. 16 is a sectional view of a portion near the sealing plate 2 taken along line XVI-XVI in FIG. 1. The first positive electrode tab group 40*a* and the second positive electrode tab group 40*b* are each bent and are connected to portions of the second positive electrode current collector 6*b*, the portions being disposed along the sealing plate 2. With such a structure, the rectangular secondary battery 20 has higher volume energy density.

The second insulator 63 as an insulator has the base portion 630*a*, which is disposed between the sealing plate 2 and the second positive electrode current collector 6*b* as the positive electrode current collector member 6, and the first wall portion 630*b*, which protrudes toward the electrode body 3 from one end portion of the base portion 630*a* in the transversal direction of the sealing plate 2. The first wall portion 630*b* is disposed between the first positive electrode tab group 40*a* and a side surface of the rectangular casing 1 near the first positive electrode tab group 40*a* (a side surface on the left side in FIG. 16). Therefore, the first positive electrode tab group 40*a* and the rectangular casing 1 do not directly contact each other easily. Thus, the rectangular secondary battery has higher reliability.

On the base portion 630*a* of the second insulator 63 as an insulator, the second wall portion 630*c* protrudes toward the electrode body 3 from the other end portion in the transversal direction of the sealing plate 2. The second wall portion 630*c* is disposed between the second positive electrode tab group 40*b* and a side surface of the rectangular casing 1 near the second positive electrode tab group 40*b* (a side surface on the left side in FIG. 16). Therefore, the second positive electrode tab group 40*b* and the rectangular casing 1 do not directly contact each other easily. Thus, the rectangular secondary battery has higher reliability.

An outer surface of the first positive electrode tab group 40*a* on the first wall portion 630*b* side is in contact with an inner side surface of the first wall portion 630*b*. With such a structure, it is possible to suppress deformation of the first positive electrode tab group 40*a* into an unintended shape. Therefore, it is possible to more effectively prevent breakage or damage of the positive electrode tabs 40 of the first positive electrode tab group 40*a*. It is possible to more effectively prevent occurrence of an unexpected short circuit between positive and negative electrodes.

An outer surface of the second positive electrode tab group 40*b* on the second wall portion 630*c* side is in contact with an inner side surface of the second wall portion 630*c*. With such a structure, it is possible to suppress deformation of the second positive electrode tab group 40*b* into an unintended shape. Therefore, it is possible to more effectively prevent breakage or damage of the positive electrode tabs 40 of the second positive electrode tab group 40*b*. It is possible to more effectively prevent occurrence of an unexpected short circuit between positive and negative electrodes.

As illustrated in FIG. 16, preferably, an end portion of the insulation sheet 14 on the sealing plate 2 side is located nearer than the lower end of the first wall portion 630*b* to the sealing plate 2. That is, preferably, the insulation sheet 14 extends from a position between the rectangular casing 1 and the electrode body 3 to a position between the rectangular casing 1 and the first wall portion 630*b*. Preferably, an end portion of the insulation sheet 14 on the sealing plate 2 side is located nearer than the lower end of the second wall portion 630*c* to the sealing plate 2. That is, preferably, the insulation sheet 14 extends from a position between the rectangular casing 1 and the electrode body 3 to a position between the rectangular casing 1 and the second wall portion 630*c*. Thus, the insulation sheet 14 and the first wall portion 630*b* overlap in the transversal direction of the sealing plate 2, and the insulation sheet 14 and the second wall portion 630*c* overlap in the transversal direction of the sealing plate 2. Therefore, it is possible to more reliably prevent the first positive electrode tab group 40*a* or the second positive electrode tab group 40*b* from directly contacting the rectangular casing 1. Preferably, in the transversal direction of the sealing plate 2, the thickness of the first wall portion 630*b* and the thickness of the second wall portion 630*c* are each larger than the thickness of the insulation sheet 14.

As illustrated in FIG. 16, in the transversal direction of the sealing plate 2, the distance between the rectangular casing 1 and the first wall portion 630*b* is larger than the distance between the rectangular casing 1 and the electrode body 3. The distance between the rectangular casing 1 and the second wall portion 630*c* is larger than the distance between the rectangular casing 1 and the electrode body 3 in the transversal direction of the sealing plate 2. With such a structure, it is possible to more reliably prevent the first positive electrode tab group 40*a* or the second positive electrode tab group 40*b* from directly contacting the rectangular casing 1.

The positive electrode current collector member 6 is composed of the first positive electrode current collector 6*a* and the second positive electrode current collector 6*b*, and the first positive electrode tab group 40*a* and the second positive electrode tab group 40*b* are connected to the second positive electrode current collector. Therefore, it is possible to make a rectangular secondary battery having higher volume energy density by using a simpler method.

Figure 17:
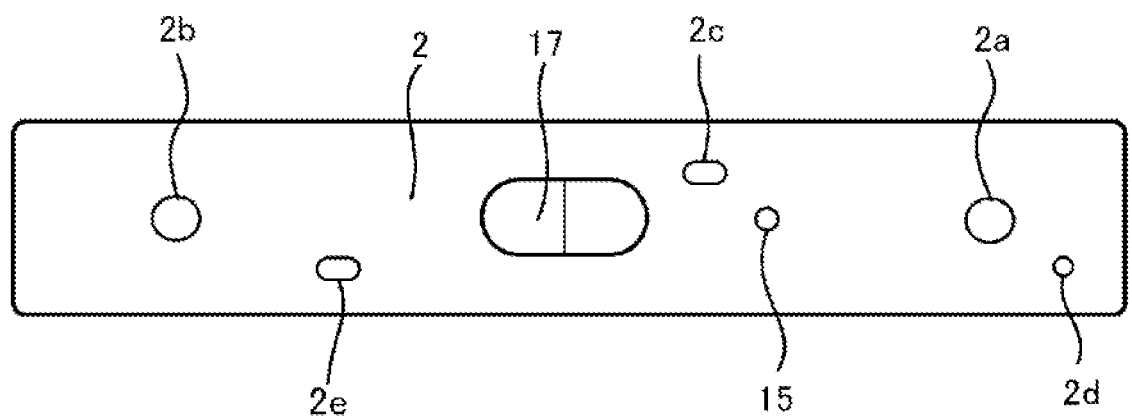
FIG. 17 illustrates a surface of the sealing plate inside the battery before the components are attached.

As illustrated in FIG. 17, a surface of the sealing plate 2 on the electrode body 3 side has a first recess 2*c*. As illustrated in FIG. 6, a first protusion 70 protrudes from a part of the second insulator 63 facing the sealing plate 2. In the rectangular secondary battery 20, the first protusion 70 is disposed in the first recess 2*c*. Thus, it is possible to suppress large displacement of the second insulator 63 with respect to the sealing plate 2 in a plane parallel to the sealing plate 2.

The shapes of the first protusion 70 and the first recess 2*c* are not particularly limited. Preferably, the shape of the first protusion 70 is a circular shape, when seen in the direction perpendicular to the sealing plate 2. Preferably, the shape of the first recess 2c is a circular shape, and more preferably an elongated circular shape, when seen in the direction perpendicular to the sealing plate 2.

The difference between the width of the first recess 2c and the width of the first protusion 70 in the transversal direction of the sealing plate 2 is preferably 5 mm or smaller, more preferably 3 mm or smaller, and further preferably 1 mm or smaller.

Preferably, the width of the first recess 2c in the longitudinal direction of the sealing plate 2 is larger than the width of the first recess 2c in the transversal direction of the sealing plate 2, when seen in the direction perpendicular to the sealing plate 2.

The difference between the width of the first recess 2c and the width of the first protusion 70 in the longitudinal direction of the sealing plate 2 is larger than the difference between the width of the first recess 2c and the width of the first protusion 70 in the transversal direction of the sealing plate 2. With such a structure, it is possible to suppress displacement of the second insulator 63 with respect to the sealing plate 2 in the transversal direction of the sealing plate 2, and to easily attach the second insulator 63 to the sealing plate 2.

The shapes of the first protrusion 70 and the first recess 2c in plan view are each preferably a linear shape or a dot shape, and more preferably a dot shape.

Preferably, the first recess 2c is disposed between the gas discharge valve 17 and the electrolyte injection hole 15 in the longitudinal direction of the sealing plate 2. Preferably, the second insulator 63 is connected to another component at a position nearer than the electrolyte injection hole 15 to the positive electrode terminal 7 in the longitudinal direction of the sealing plate 2. With such a structure, because the second insulator 63 is directly or indirectly connected to the sealing plate 2 at a plurality of positions that are further apart, it is possible to more effectively suppress displacement of the second insulator 63 with respect to the sealing plate 2 in a plane parallel to the sealing plate 2. In the rectangular secondary battery 20, the second insulator 63 is connected to the first insulator 10 that is fixed to the sealing plate 2. The second insulator 63 is fixed to the conductor 61 that is fixed to the sealing plate 2 with the first insulator 10 and the positive electrode terminal 7 interposed therebetween.

Preferably, the first recess 2c is displaced to a position nearer than the center of the sealing plate 2 to an end portion of the sealing plate 2 in the transversal direction of the sealing plate 2. With such a structure, it is possible to suppress decrease of the strength of the sealing plate 2 even when the sealing plate 2 has the first recess 2c. Therefore, the sealing plate 2 does not deform easily.

In the rectangular secondary battery 20, the second insulator 63 has the insulator first region 63x, which is disposed between the deformable plate 62 and the first positive electrode current collector 6a and which is fixed to the first positive electrode current collector 6a, and the insulator second region 63y, which is disposed on the sealing plate 2. The first protrusion 70 is formed on the insulator second region of the second insulator 63. Therefore, it is possible to suppress application of a load to a fragile part of the circuit breaker mechanism 60 due to displacement of the second insulator 63 with respect to the sealing plate 2. It is possible to prevent damage to the first positive electrode tab group 40a or the second positive electrode tab group 40b.

Preferably, the depth of the first recess 2c is 30% to 70% of the thickness of the sealing plate 2 around the first recess 2c. In the transversal direction of the sealing plate 2, the distance from the center of the sealing plate 2 to the first recess 2c is preferably 1/10 or larger, more preferably 1/8 or larger, and further preferably 1/5 or larger of the length of the sealing plate 2.

As illustrated in FIG. 17, the surface of the sealing plate 2 on the electrode body 3 side has a second recess 2d. As illustrated in FIG. 6, a second protrusion 71 protrudes from a part of the first insulator 10 facing the sealing plate 2. In the rectangular secondary battery 20, the second protrusion 71 is disposed in the second recess 2d. Thus, it is possible to suppress large displacement of the first insulator 10 with respect to the sealing plate 2 in a plane parallel to the sealing plate 2.

The shapes of the second protrusion 71 and the second recess 2d are not particularly limited. Preferably, the shape of the second protrusion 71 is a circular shape, when seen in the direction perpendicular to the sealing plate 2. The shape of the second recess 2d is preferably a circular shape, and more preferably an elongated circular shape, when seen in the direction perpendicular to the sealing plate 2.

The difference between the width of the second recess 2d and the width of the second protrusion 71 in the transversal direction of the sealing plate 2 is preferably 5 mm or smaller, more preferably 3 mm or smaller, and further preferably 1 mm or smaller.

The shapes of the second protrusion 71 and the second recess 2d in plan view are each preferably a linear shape or a dot shape, and more preferably a dot shape.

Preferably, the second insulator 63, which is disposed between the deformable plate 62 and the first positive electrode current collector 6a and which is fixed to the first positive electrode current collector 6a, is connected to the first insulator 10. In such a case, by disposing the second protrusion 71 of the first insulator 10 in the second recess 2d of the sealing plate 2 to suppress large displacement of the first insulator 10 with respect to the sealing plate 2, it is possible to more effectively suppress application of a load to a fragile part of the circuit breaker mechanism 60.

Preferably, the second recess 2d is disposed further outward than the positive electrode terminal attachment hole 2a in the longitudinal direction of the sealing plate 2. With such a structure, it is possible to suppress decrease of the strength of the sealing plate 2, compared with a case where the second recess 2d is disposed further inward than the positive electrode terminal attachment hole 2a in the longitudinal direction of the sealing plate 2. Preferably, the second recess 2d is disposed nearer than the center of the sealing plate 2 to an end portion of the sealing plate 2 in the transversal direction of the sealing plate 2. In a case where the first recess 2c is formed in the sealing plate 2, preferably, the first recess 2c is formed on one side of the center of the sealing plate 2 and the second recess 2d is formed on the other side of the center of the sealing plate 2 in the transversal direction of the sealing plate 2.

Preferably, the depth of the second recess 2d is 30% to 70% of the thickness of the sealing plate 2 around the second recess 2d. In the transversal direction of the sealing plate 2, the distance from the center of the sealing plate 2 to the second recess 2d is preferably 1/10 or larger, more preferably 1/8 or larger, and further preferably 1/5 or larger of the length of the sealing plate 2.

Figure 18:
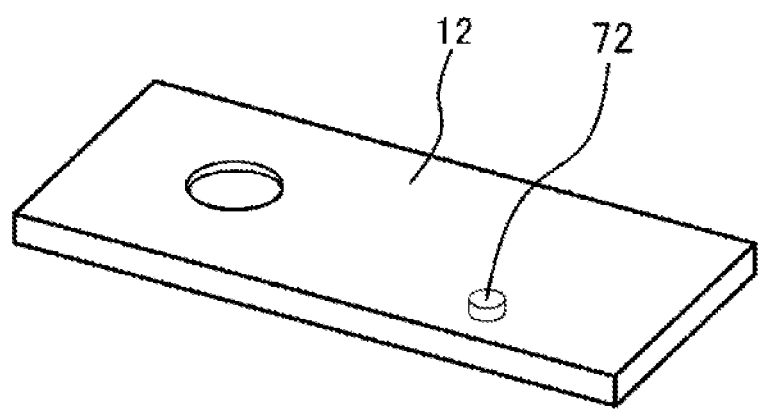
FIG. 18 is a perspective view of an inner insulator on the negative electrode side.

As illustrated in FIG. 17, the surface of the sealing plate 2 on the electrode body 3 side has a third recess 2e. As illustrated in FIG. 18, a third protrusion 72 protrudes from a portion of the inner insulator 12, which is disposed between the sealing plate 2 and the second negative electrode current collector 8b, the portion facing the sealing plate 2. In the rectangular secondary battery 20, the third protrusion 72 is disposed in the third recess 2e. Thus, it is possible to suppress large displacement of the inner insulator 12 with respect to the sealing plate 2 in a plane parallel to the sealing plate 2.

The shapes of the third protrusion 72 and the third recess 2e are not particularly limited. Preferably, the shape of the third protrusion 72 is a circular shape, when seen in the direction perpendicular to the sealing plate 2. The shape of the third recess 2e is preferably a circular shape, and more preferably an elongated circular shape, when seen in the direction perpendicular to the sealing plate 2.

The difference between the width of the third recess 2e and the width of the third protrusion 72 in the transversal direction of the sealing plate 2 is preferably 5 mm or smaller, more preferably 3 mm or smaller, and further preferably 1 mm or smaller.

Preferably, the width of the third recess 2e in the longitudinal direction of the sealing plate 2 is larger than the width of the third recess 2e in the transversal direction of the sealing plate 2, when seen in the direction perpendicular to the sealing plate 2.

Preferably, the difference between the width of the third recess 2e and the width of the third protrusion 72 in the longitudinal direction of the sealing plate 2 is larger than the difference between the width of the third recess 2e and the width of the third protrusion 72 in the transversal direction of the sealing plate 2. With such a structure, it is possible to suppress displacement of the inner insulator 12 relative to the sealing plate 2 in the transversal direction of the sealing plate 2, and to easily attach the inner insulator 12 to the sealing plate 2.

The shapes of the third protrusion 72 and the third recess 2e in plan view are each preferably a linear shape or a dot shape, and more preferably a dot shape.

Preferably, the third recess 2e is displaced to a position nearer than the center of the sealing plate 2 to an end portion of the sealing plate 2 in the transversal direction of the sealing plate 2. With such a structure, it is possible to suppress decrease of the strength of the sealing plate 2 even when the sealing plate 2 has the third recess 2e.

Preferably, in the transversal direction of the sealing plate 2, the first recess 2c, in which the first protusion 70 of the second insulator 63 disposed between the sealing plate 2 and the second positive electrode current collector 6b is disposed, is located on one side of the center of the sealing plate 2; and the third recess 2e, in which the third protrusion 72 of the inner insulator 12 disposed between the sealing plate 2 and the second negative electrode current collector 8b is disposed, is located on the other side of the center of the sealing plate 2. With such a structure, it is possible to suppress decrease of the strength of the sealing plate 2.

In the rectangular secondary battery 20 according to the embodiment described above, the second insulator 63 has the base portion 630a disposed between the sealing plate 2 and the second positive electrode current collector 6b, the first wall portion 630b, and the second wall portion 630c. Instead of providing the second insulator 63 with the base portion and the wall portions, the first insulator 10 may have a base portion disposed between the sealing plate 2 and the second positive electrode current collector 6b, and wall portions that extend from the base portion toward the electrode body 3.

In the rectangular secondary battery 20 according to the embodiment described above, the first wall portion 630b and the second wall portion 630c are disposed on the base portion 630a. However, only one of the first wall portion 630b and the second wall portion 630c may be disposed on the base portion 630a. Preferably, both of the first wall portion 630b and the second wall portion 630c are disposed on the base portion 630a.

In the rectangular secondary battery 20 according to the embodiment described above, the plurality of positive electrode tabs 40 are divided into the first positive electrode tab group 40a and the second positive electrode tab group 40b. However, the plurality of positive electrode tabs 40 may constitute a single tab group. Preferably, the positive electrode tabs 40 are divided into the first positive electrode tab group 40a and the second positive electrode tab group 40b.

The rectangular secondary battery 20 according to the embodiment described above has the circuit breaker mechanism 60. However, the circuit breaker mechanism 60 may be omitted. In a case where the circuit breaker mechanism 60 is omitted, the positive electrode side of the rectangular secondary battery 20 may have a structure similar to that of the negative electrode side.

In the rectangular secondary battery 20 according to the embodiment described above, the positive electrode current collector member 6 is composed of two components, which are the first positive electrode current collector 6a and the second positive electrode current collector 6b. However, the positive electrode current collector member 6 may be a single component. In the rectangular secondary battery 20 according to the embodiment described above, the negative electrode current collector member 8 is composed of two components, which are the first negative electrode current collector 8a and the second negative electrode current collector 8b. However, the negative electrode current collector member 8 may be a single component.

In the rectangular secondary battery 20 according to the embodiment described above, the first positive electrode tab group 40a and the second positive electrode tab group 40b are bent in different directions, and the first negative electrode tab group 50a and the second negative electrode tab group 50b are bent in different directions. However, this is not a limitation. The first positive electrode tab group 40a and the second positive electrode tab group 40b may be bent in the same direction, and the first negative electrode tab group 50a and the second negative electrode tab group 50b may be bent in the same direction.

In the rectangular secondary battery 20 according to the embodiment described above, the positive electrode terminal 7 and the negative electrode terminal 9 are insulated from the sealing plate 2. However, one of the positive electrode terminal 7 and the negative electrode terminal 9 may be electrically connected to the sealing plate 2.

Preferably, the gas discharge valve 17 of the sealing plate 2 is a thin portion of the sealing plate 2. The thin portion as the gas discharge valve 17 can be formed, for example, by press forming. A through-hole may be formed in the sealing plate 2, the through-hole may be closed with a thin valve body, and the valve body may be welded to the sealing plate 2.

<Others>

Preferably, a breakable portion that breaks when the deformable plate deforms is a fragile part of a current collector member, a connection portion between a current collector member and the deformable plate, or a fragile part of the deformable plate. Preferably, the fragile part is a thin portion, a notch, or the like.

Preferably, the first insulator, the second insulator, and the cover portion are each made of a resin. Examples of the resin include polypropylene, polyethylene, perfluoroalkoxyalkane (PFA), polytetrafluoroethylene (PTFE), and ethylene-tetrafluoroethylene copolymer (ETFE).

In the embodiment described above, the electrode body 3 is composed of two electrode body elements 3a and 3b. However, this is not a limitation. The electrode body 3 may be a single stacked electrode body. The electrode body 3 may be a single rolled electrode body in which an elongated positive electrode plate and an elongated negative electrode plate are rolled with a separator interposed therebetween. Each of the two electrode body elements 3a and 3b is not limited to a stacked electrode body and may be a rolled electrode body in which an elongated positive electrode plate and an elongated negative electrode plate are rolled with a separator interposed therebetween.

In a case where the electrode body is a stacked electrode body that has a plurality of positive electrode plates and a plurality of negative electrode plates, or, in a case where the electrode body is a rolled electrode body and the roll axis is disposed so as to be perpendicular to the sealing plate, preferably, an end portion of the positive electrode plate and an end portion of the negative electrode plate are located on the sealing plate side in the electrode body. With such a structure, in a case where the sealing plate has an electrolyte injection hole, ease of injection of an electrolyte into the electrode body is improved. In such a case, preferably, an end portion of the separator on the sealing plate side protrudes further toward the sealing plate 2 than an end portion of the negative electrode active material mixture layer of the negative electrode plate on the sealing plate side. In the electrode body, preferably, an end portion of the separator on the sealing plate side protrudes further toward the sealing plate than an end portion of the positive electrode active material mixture layer of the positive electrode plate on the sealing plate side. Preferably, the positive electrode plate and the separator are bonded via an adhesive layer, and the negative electrode plate and the separator are bonded via an adhesive layer. With such a structure, it is possible to reliably prevent the positive electrode active material mixture layer and the negative electrode active material mixture layer from contacting the second insulator, and the positive electrode active material mixture layer or the negative electrode active material mixture layer from being damaged.

REFERENCE SIGNS LIST

20 . . . rectangular secondary battery 1 . . . rectangular casing 2 . . . sealing plate 2a . . . positive electrode terminal attachment hole 2b . . . negative electrode terminal attachment hole 2c . . . first recess 2d . . . second recess 2e . . . third recess 100 . . . battery case 3 . . . electrode body 3a . . . first electrode body element 3b . . . second electrode body element 4 . . . positive electrode plate 4a . . . positive electrode core 4b . . . positive electrode active material mixture layer 4d . . . positive electrode protection layer 40 . . . positive electrode tab 40a . . . first positive electrode tab group 40b . . . second positive electrode tab group 5 . . . negative electrode plate 5a . . . negative electrode core 5b . . . negative electrode active material mixture layer 50 . . . negative electrode tab 50a . . . first negative electrode tab group 50b . . . second negative electrode tab group 6 . . . positive electrode current collector member 6a . . . first positive electrode current collector 6c . . . connection hole 6d . . . fixing hole 6d1 . . . small-diameter portion 6d2 . . . large-diameter portion 6e . . . displacement prevention hole 6f . . . thin portion 6g . . . notch 6h . . . connection rib 6x . . . current collector protrusion 6w . . . current collector second recess 6b . . . second positive electrode current collector 6b1 . . . current collector first region 6b2 . . . current collector second region 6b3 . . . current collector third region 6k . . . target hole 6m . . . current collector first recess 6y . . . current collector first opening 6z . . . current collector second opening 7 . . . positive electrode terminal 7a . . . flange 7b . . . insertion portion 7c . . . terminal through-hole 7x . . . terminal sealing member 7y . . . metal member 7z . . . rubber member 8 . . . negative electrode current collector member 8a . . . first negative electrode current collector 8x . . . current collector protrusion 8w . . . current collector second recess 8b . . . second negative electrode current collector 8b1 . . . current collector first region 8b2 . . . current collector second region 8b3 . . . current collector third region 8e . . . target hole 8f . . . current collector first recess 8y . . . current collector first opening 9 . . . negative electrode terminal 10 . . . first insulator 10a . . . first insulator body 10b . . . first side wall 10c . . . second side wall 10d . . . second terminal insertion hole 10e . . . first connection portion 10f . . . second connection portion 10g . . . recess 10x . . . first groove 10y . . . second groove 11 . . . outer insulator 11a . . . first terminal insertion hole 12 . . . inner insulator 13 . . . outer insulator 14 . . . insulation sheet 15 . . . electrolyte injection hole 16 . . . sealing plug 17 . . . gas discharge valve 60 . . . circuit breaker mechanism 61 . . . conductor 61a . . . conductor base portion 61b . . . tubular portion 61c . . . third terminal insertion hole 61d . . . flange 61e . . . pressing protrusion 61f . . . conductor opening 62 . . . deformable plate 62a . . . stepped protrusion 62a1 . . . first protrusion 62a2 . . . second protrusion 62b . . . annular rib 62c . . . annular thin portion 63 . . . second insulator 63x . . . insulator first region 63a . . . insulator first opening 63b . . . third wall portion 63c . . . fourth wall portion 63d . . . third connection portion 63e . . . fourth connection portion 63f . . . fixing protrusion 63f1 . . . enlarged-diameter portion 63g . . . displacement prevention protrusion 63h . . . claw portion 63y . . . insulator second region 63i . . . insulator second opening 63k . . . insulator annular rib 630a . . . base portion 630b . . . first wall portion 630c . . . second wall portion 63z . . . insulator third region 70 . . . first protrusion 71 . . . second protrusion 72 . . . third protrusion 80 . . . cover portion 90 . . . weld

The invention claimed is:

1. A rectangular secondary battery comprising:
an electrode body that includes a positive electrode plate and a negative electrode plate;
a rectangular casing that has an opening and contains the electrode body;
a sealing plate that seals the opening;
a tab that is provided on the positive electrode plate or the negative electrode plate;
a tab group that is composed of a plurality of the tabs;
a terminal that is electrically connected to the tab group and attached to the sealing plate;
a current collector member that is electrically connected to the tab group and the terminal; and
an insulator that is disposed between the sealing plate and the current collector member,
wherein the sealing plate has a gas discharge valve,
wherein the sealing plate has a first recess at a position facing the insulator,
wherein the insulator has a first protrusion at a position facing the sealing plate,
wherein the first protrusion is disposed in the first recess,
wherein, in a transversal direction of the sealing plate, the first recess is displaced from a center of the sealing plate toward an end portion of the sealing plate,
wherein a depth of the first recess is 30% to 70% of a thickness of the sealing plate around the first recess, a first insulator that is disposed on the electrode body side of the sealing plate;

a conductor that has an opening on the electrode body side and that is disposed on the electrode body side of the first insulator;

a deformable plate that seals the opening of the conductor; and a second insulator that is disposed between the deformable plate and the current collector member, wherein the second insulator includes an insulator first region that is disposed so as to face the deformable plate and an insulator second region that is located nearer than the insulator first region to the center of the sealing plate in a longitudinal direction of the sealing plate and that is disposed on the sealing plate, wherein the insulator is the second insulator, and wherein the first protrusion is disposed on the insulator second region.

2. The rectangular secondary battery according to claim 1, wherein, in the transversal direction of the sealing plate, a distance from the center of the sealing plate to the first recess is 1/10 or larger of a length of the sealing plate.

3. The rectangular secondary battery according to claim 1, wherein, when the sealing plate is seen in plan view, a width of the first recess in the transversal direction of the sealing plate is smaller than a width of the first recess in a longitudinal direction of the sealing plate.

4. The rectangular secondary battery according to claim 1, wherein the current collector member includes a first current collector member that is disposed on the electrode body side of the deformable plate and a second current collector member to which the tab group is connected, and wherein the first current collector member and the second current collector member are welded to each other.

5. The rectangular secondary battery according to claim 1, wherein a second recess is formed in a part of the sealing plate facing the first insulator, wherein a second protrusion is formed on a part of the first insulator facing the sealing plate, and wherein the second protrusion is disposed in the second recess.

6. The rectangular secondary battery according to claim 5, wherein, in the transversal direction of the sealing plate, the first recess and the first protrusion are located nearer than the center of the sealing plate to one end portion of the sealing plate, and wherein, in the transversal direction of the sealing plate, the second recess and the second protrusion are located nearer than the center of the sealing plate to the other end portion of the sealing plate.

7. A rectangular secondary battery comprising:

an electrode body that includes a positive electrode plate and a negative electrode plate;

a rectangular casing that has an opening and contains the electrode body;

a sealing plate that seals the opening;

a tab that is provided on the positive electrode plate or the negative electrode plate;

a tab group that is composed of a plurality of the tabs;

a terminal that is electrically connected to the tab group and attached to the sealing plate;

a current collector member that is electrically connected to the tab group and the terminal;

an insulator that is disposed between the sealing plate and the current collector member;

a first insulator that is disposed on the electrode body side of the sealing plate;

a conductor that has an opening on the electrode body side and that is disposed on the electrode body side of the first insulator;

a deformable plate that seals the opening of the conductor; and a second insulator that is disposed between the deformable plate and the current collector member, wherein the sealing plate has a gas discharge valve, wherein the sealing plate has a first recess at a position facing the insulator, wherein the insulator has a first protrusion at a position facing the sealing plate, wherein the first protrusion is disposed in the first recess, wherein, in a transversal direction of the sealing plate, the first recess is displaced from a center of the sealing plate toward an end portion of the sealing plate, wherein the second insulator includes an insulator first region that is disposed so as to face the deformable plate and an insulator second region that is located nearer than the insulator first region to the center of the sealing plate in a longitudinal direction of the sealing plate and that is disposed on the sealing plate, wherein the insulator is the second insulator, and wherein the first protrusion is disposed on the insulator second region.

8. The rectangular secondary battery according to claim 7, wherein the current collector member includes a first current collector member that is disposed on the electrode body side of the deformable plate and a second current collector member to which the tab group is connected, and wherein the first current collector member and the second current collector member are welded to each other.

9. The rectangular secondary battery according to claim 7, wherein a second recess is formed in a part of the sealing plate facing the first insulator, wherein a second protrusion is formed on a part of the first insulator facing the sealing plate, and wherein the second protrusion is disposed in the second recess.

10. The rectangular secondary battery according to claim 9, wherein, in the transversal direction of the sealing plate, the first recess and the first protrusion are located nearer than the center of the sealing plate to one end portion of the sealing plate, and wherein, in the transversal direction of the sealing plate, the second recess and the second protrusion are located nearer than the center of the sealing plate to the other end portion of the sealing plate.

* * * * *